(12) United States Patent
Schulte et al.

(10) Patent No.: US 12,405,104 B2
(45) Date of Patent: Sep. 2, 2025

(54) MEASUREMENT APPARATUS, METHOD FOR MEASURING BY INTERFEROMETRY, PROCESSING METHOD, OPTICAL ELEMENT AND LITHOGRAPHY SYSTEM

(71) Applicant: Carl Zeiss SMT GmbH, Oberkochen (DE)

(72) Inventors: Stefan Schulte, Stoedtlen (DE); Vladan Blahnik, Oberkochen (DE); Martin Peschka, Aalen (DE)

(73) Assignee: CARL ZEISS SMT GMBH, Oberkochen (DE)

( * ) Notice: Subject to any disclaimer, the term of this patent is extended or adjusted under 35 U.S.C. 154(b) by 177 days.

(21) Appl. No.: 18/228,010

(22) Filed: Jul. 31, 2023

(65) Prior Publication Data

US 2024/0035811 A1 Feb. 1, 2024

(30) Foreign Application Priority Data

Jul. 29, 2022 (DE) .................... 10 2022 207 884.5

(51) Int. Cl.
*G01B 9/02017* (2022.01)
*G01B 9/02* (2022.01)
(Continued)

(52) U.S. Cl.
CPC ..... *G01B 9/02019* (2013.01); *G01B 9/02038* (2013.01); *G01B 11/2441* (2013.01); *G01B 11/30* (2013.01)

(58) Field of Classification Search
CPC ............ G01B 9/02019; G01B 9/02038; G01B 11/2441; G01B 11/30
See application file for complete search history.

(56) References Cited

U.S. PATENT DOCUMENTS 3,476,463 A 11/1969 Kreuzer
6,573,978 B1 6/2003 McGuire, Jr.
(Continued)

FOREIGN PATENT DOCUMENTS

DE 102008009600 A1 8/2009
DE 102012214610 A1 9/2013
(Continued)

OTHER PUBLICATIONS

Fleig, Jon et al. "An automated subaperture stitching interferometer workstation for spherical and aspherical surface". Proceedings of SPIE vol. 5188, Advanced Characterization Techniques for Optics, Semiconductors, and Nanotechnologies, 2003, pp. 296-307. (Year: 2003).*

(Continued)

*Primary Examiner* — Michael A Lyons
(74) *Attorney, Agent, or Firm* — Edell, Shapiro & Finnan, LLC

(57) ABSTRACT

A measurement apparatus (1) for measuring a shape of a surface (2) of a test object (3), in particular an optical surface (2) by interferometry, has:
 an illumination device (4) with an illumination source (5) for generating an illumination wave (6),
 an interferometer device (7) with a splitting element (8) for splitting the illumination wave into a test wave (9) directed at the surface (2) and into a reference wave (10), and for combining the returning test wave (9), having interacted with the surface to be measured, with the reference wave (10),
 a registration device (11) for registering and evaluating an interference pattern to determine a deviation of the measured surface shape from a target shape, and
(Continued)

a control device (12) configured to split the surface (2) to be measured into a plurality of individual areas (13) to be measured.

23 Claims, 9 Drawing Sheets

(51) Int. Cl.
*G01B 11/24* (2006.01)
*G01B 11/30* (2006.01)

(56) References Cited

U.S. PATENT DOCUMENTS

| | | |
|---|---|---|
| 2003/0103215 A1 | 6/2003 | Kuchel |
| 2005/0134863 A1* | 6/2005 | De Lega ............ G01B 9/02039 356/512 |
| 2006/0132747 A1 | 6/2006 | Singer et al. |
| 2009/0262362 A1* | 10/2009 | de Groot .......... G01N 21/95607 356/508 |
| 2015/0192769 A1* | 7/2015 | Dresel ................ G01B 9/02085 356/450 |
| 2016/0298951 A1 | 10/2016 | Schulte et al. |
| 2018/0074303 A1 | 3/2018 | Schwab |

FOREIGN PATENT DOCUMENTS

| | | |
|---|---|---|
| DE | 102013226668 A1 | 6/2015 |
| EP | 1614008 B1 | 12/2009 |
| WO | WO-2022081178 A1 * | 4/2022 ......... G01B 11/0675 |

OTHER PUBLICATIONS

German Office Action with English translation, Application No. 10 2022 207 884.5, Mar. 28, 2023, 6 pages.

* cited by examiner

- - - - - 6
———— 9
·········· 10
— · · — 35

MEASUREMENT APPARATUS, METHOD FOR MEASURING BY INTERFEROMETRY, PROCESSING METHOD, OPTICAL ELEMENT AND LITHOGRAPHY SYSTEM

CROSS-REFERENCE TO RELATED APPLICATIONS

The present application claims the priority of the German patent application no. 10 2022 207 884.5, which is incorporated in its entirety into the present application by reference.

FIELD OF THE INVENTION

The invention relates to a measurement apparatus for measuring a shape of a surface of a test object, in particular an optical surface of an optical element, by interferometry, having an illumination device comprising an illumination source for generating an illumination wave, and an interferometer device comprising a splitting element for splitting the illumination wave into a test wave which is directed at the surface and into a reference wave, and a registration device for combining the returning test wave, which has interacted with the surface to be measured, with the reference wave, for registering an interference pattern and for evaluating the interference pattern in order to determine a deviation of the shape of the surface to be measured from a target shape, and a control device which is configured to split the surface to be measured into a plurality of individual areas to be measured, and a positioning device which is configured to position the test wave in such a way on the surface to be measured that the respective individual area is fully illuminated, wherein the registration device is configured to determine, on the basis of the data from the individual areas, a deviation of the shape of at least a part of the surface to be measured from the target shape.

The invention also relates to a method for measuring a shape of a surface of a test object, in particular an optical surface of an optical element, by interferometry, whereby an illumination wave is split into a test wave which is directed at the surface and a reference wave by a splitting element, whereby the returning test wave which has interacted with the surface to be measured is combined with the reference wave and an interference pattern is generated, whereby the interference pattern is evaluated in order to determine a deviation of the shape of the surface to be measured from a target shape, whereby the surface to be measured is split into a plurality of individual areas to be measured in succession, whereby the test wave is positioned on the surface to be measured such that the respective individual area is illuminated in full in at least approximately perpendicular fashion.

The invention also relates to a processing method for processing a test object, in particular an optical element, in particular for a lithography system, in particular for a projection exposure apparatus for semiconductor lithography, whereby a shape of a surface of the test object, in particular an optical surface of the optical element is processed such that the shape of the surface is at least approximated to a target shape.

The invention also relates to an optical element, in particular for a lithography system.

Moreover, the invention relates to a lithography system, in particular a projection exposure apparatus for semiconductor lithography, having an illumination system with a radiation source and an optical unit which comprises at least one optical element.

BACKGROUND

Optical elements for guiding and shaping radiation in projection exposure apparatuses are known from the prior art. In the known optical elements, a surface of the optical element frequently guides and shapes the light waves incident on the optical element. Therefore, to form an exact wavefront with desired properties, precise control of the shape of the surface is particularly advantageous.

The prior art has disclosed lithography systems which use ultraviolet radiation, in particular DUV (deep ultraviolet) and/or EUV (extreme ultraviolet) light in order to produce microlithographic structures with utmost precision. Here, the light of a radiation source is steered to a wafer to be exposed by way of a plurality of mirrors. An exact embodiment of the surface shape of the mirror makes a decisive contribution here to the quality of the exposure.

Since the demands in respect of accuracy on the optical elements of a lithography system, especially on mirror surfaces, amount to fractions of nanometres for example, the prior art has disclosed the practice of using interferometric measuring methods and apparatuses for the purpose of verifying the quality of the optical elements of the lithography system.

The prior art has disclosed the practice of using interferometers to verify the optical surface of mirrors, with a test light wave from the interferometer only scanning a partial region of the mirror in each case. According to the prior art, deviations from a target shape of the mirror in the partial region are determined through interferometric methods.

A disadvantage of the apparatuses and methods known from the prior art is that the partial region-based scanning of optical surfaces for the purpose of being able to determine the shape of the surface with desired reliability and precision requires much time.

SUMMARY

One object of the present invention is to develop a measurement apparatus for measuring a shape of a surface of a test object by interferometry, which avoids the disadvantages of the prior art, in particular enables a time-efficient and precise determination of the shape of the surface.

Another object of the present invention is to develop a method for measuring a shape of a surface of a test object by interferometry, which avoids the disadvantages of the prior art, in particular enables a time-efficient and precise determination of the shape of the surface.

A further object of the present invention is to develop a processing method for processing a test object, which avoids the disadvantages of the prior art, in particular enables time-efficient and precise processing of the surface.

Yet another object of the present invention is to develop an optical element which avoids the disadvantages of the prior art, in particular comprises a surface which was processed in precise fashion.

Still a further object of the present invention is to develop a lithography system which avoids the disadvantages of the prior art, in particular has very precise, shaped wavefronts for exposing wafers.

The measurement apparatus according to the invention for measuring a shape of a surface of a test object, in particular an optical surface of an optical element, by interferometry, comprises at least the following constituent parts:

an illumination device comprising an illumination source for generating an illumination wave, and an interferometer device comprising a splitting element for splitting the illumination wave into a test wave which is directed at the surface and into a reference wave, and a registration device for combining the returning test wave, which has interacted with the surface to be measured, with the reference wave, for registering an interference pattern and for evaluating the interference pattern in order to determine a deviation of the shape of the surface to be measured from a target shape, and a control device which is configured to split the surface to be measured into a plurality of individual areas to be measured, and a positioning device which is configured to position the test wave in such a way on the surface to be measured that the respective individual area is fully illuminated, wherein the registration device is configured to determine, on the basis of the data from the individual areas, a deviation of the shape of at least a part of the surface to be measured from the target shape.

According to the invention, provision is made for the illumination device to comprise at least one adjustable stop device which is configured to define a subaperture of the interferometer device and adapt it to the individual area to be measured in each case.

The measurement apparatus according to the invention is advantageous in that the subaperture is adaptable, preferably dynamically, to the individual area to be measured in each case. As a result, the surface can be measured particularly economically in terms of time since the size of the subaperture can be adapted to a respective expected surface shape of the individual area.

Provision can be made for the control device to be configured to split the surface to be measured into a plurality of individual areas to be measured in such a way that a size and/or a shape of the individual areas to be measured is adapted to the interferometric measurability, in the region of the individual area to be measured in each case, of the expected shape of the surface to be measured. In particular, provision can be made for the individual areas to be measured to have a greater areal extent in a region of the surface to be measured which is measurable by interferometry with high precision than in portions of the optical surface to be measured which are difficult to measure.

As a result of such a, preferably dynamic, adaptation of the individual areas to a respective expanse of the surface to be measured and as a result of the subsequent adaptation of a subaperture to the individual area selected in this manner, it is possible for the measurement of the surface to proceed economically in terms of time or in time-optimized fashion. In other words, the measurement apparatus according to the invention allows an amount of data to be collected which is optimized to the respective demands on the measurement precision in the respective individual areas, with no more than the necessary amounts of data required for obtaining a desired validity for the shape of the surface to be measured being collected in each expanse of the surface to be measured.

In an advantageous development of the measurement apparatus according to the invention, provision can be made for the splitting element to be configured to form a non-spherical wavefront of the test wave.

As a result of the splitting element being configured to form a non-spherical wavefront of the test wave, it is moreover possible in the case of non-spherical surfaces to be measured for a wavefront approximately tailored to the surface to be formed, improving measurement precision.

Provision can be made for the illumination device and the registration device to be formed as part of the interferometer device.

Provision can preferably be made for the splitting element to be formed in one piece.

Alternatively, provision can also be made for the splitting element to be formed in many pieces.

Especially in the case of a splitting element formed in many pieces, provision can be made for the interferometer device to be in the form of a Michelson interferometer and/or Mach-Zehnder interferometer.

A subaperture can be understood to mean the region on the surface to be measured, to which the test wave is supplied by the interferometer device and/or from which the returning test wave is recorded by the interferometer device.

The individual subapertures are preferably significantly smaller than the diameter of the surface, for example a free-form surface of the test object, in order thus to obtain a best-possible spatial resolution. Measuring the surface, especially a free-form surface of the test object, has significant advantages over a whole-area test using a CGH (computer-generated hologram) and leads in particular to a significantly better spatial resolution; further, there are no interfering reflections which may generate high-frequency wavefront aberrations.

The adjustable stop device can preferably be in the form of a variable field stop in the illumination device of the measurement apparatus or the interferometric sensor.

The adjustable stop device may comprise one or more stops, in particular field stops. A second stop or a plurality of stops, especially field stops or iris diaphragms, are not required in principle, but supply a further degree of freedom for optimizing the field size and field shape, and hence the measurement accuracy.

Further, variable incoherent illumination settings may be provided. It may be advantageous for a coherent and/or an incoherent setting to be respectively used for all measurement tasks.

Provision can be made for the illumination wave to have a planar wavefront and consequently be a plane illumination wave.

In an advantageous development of the measurement apparatus according to the invention, provision can be made for the splitting element to be configured to form an astigmatic or toroidal wavefront as the test wave.

From the possible non-spherical wavefronts of the test wave, astigmatic and/or toroidal wavefronts are particularly suitable for measuring mirrors in EUV lithography systems. These frequently have approximately astigmatic and/or toroidal surface shapes and/or target shapes of the surface, with the result that a splitting element designed thus makes it possible to approximate the wavefront of the test wave closely to the surface shape of the surface to be measured.

Advantageously, provision can be made for the splitting element to be adapted, preferably in the best possible manner, to the target shape of the individual area to be measured.

As a result, the wavefront of the test wave can be designed so that it already largely corresponds to the optical surface to be measured in a region of the respective individual area. In this case, possible deviations, be they desired and/or undesired, of the shape of the surface to be measured from the wavefront of the test wave can be kept small and an interferometric detection of the deviations is facilitated. As a result, the shape of the surface to be measured can be determined particularly reliably.

Provision can be made for a best-possible adaptation of the splitting element to the target shape of the individual area to be measured not to correspond to a complete adaptation. This may be the case, in particular, if the target shape has a very complex embodiment but is largely based on a less complex basic shape, in particular an astigmatic and/or toroidal basic shape. In this case, the splitting element may be adapted to the basic shape.

In an advantageous development of the measurement apparatus according to the invention, provision can be made for a set of interchangeable splitting elements to be provided for measuring the surface of the test object, with the splitting elements of the set being embodied such that a splitting element adapted to the target shape of the individual area to be measured is selectable for each individual area to be measured.

By providing a set of splitting elements, it is possible in particular to particularly efficiently measure surfaces to be measured which have different dominating basic shapes in different regions. These different dominating basic shapes can be approximated particularly well by the test waves formed by the various splitting elements, provided the splitting element is chosen in accordance with the region of the surface to be measured in which the individual area to be measured is located.

A single splitting element or reference element may be provided for an entire used region of the surface or free-form surface to be measured. If a very disadvantageously shaped surface or free-form surfaces to be measured is/are present, it is possible to provide two or more splitting elements or reference elements for testing an individual surface or free-form surface to be measured, through which two or more splitting elements or reference elements different regions of the surface or free-form surface to be measured are then measured.

For the simple design of the measurement apparatus, it is advantageous if the different regions do not consist only of an individual subaperture in each case, since otherwise the measuring method would be uneconomical.

In an advantageous development of the measurement apparatus according to the invention, provision can be made for the interferometer device to be in the form of a Fizeau interferometer and for the splitting element to be in the form of a Fizeau element which comprises a reference surface and a back side surface opposite to the reference surface.

An embodiment of the interferometer device as a Fizeau interferometer and of the splitting element as a Fizeau element is advantageous in that the interferometer device can be designed to be particularly compact as a Fizeau interferometer. The reference wave and the test wave propagate substantially along the same beam path, with the result that no voluminous interferometer arms are required.

In terms of their toroid and/or astigmatic radii, the Fizeau elements can be adapted particularly advantageously to the test object to be measured or to the surface to be measured or to the selected individual area, for example a free-form surface (FFS).

In an alternative configuration, provision can also be made for a splitting element not embodied as a Fizeau element to have a back side surface and/or a reference surface. The properties of the back side surface and/or the reference surface explained in conjunction with the Fizeau element should in that case also be understood as being directed to the back side surface and/or the reference surface of the splitting element not embodied as a Fizeau element.

In an advantageous development of the measurement apparatus according to the invention, provision can be made for the reference surface of the Fizeau element to have an astigmatic and/or toroidal form.

The non-spherical wavefront or an astigmatic and/or toroidal wavefront of the test wave can be realized particularly easily by way of an astigmatically and/or toroidally shaped reference surface. The form of the astigmatically and/or toroidally shaped test wave and the reference wave is ensured in full by the Fizeau element, which in turn benefits a compact structure of the interferometer device.

Provision can be made for the reference surface to be formed as a torus adapted in the best possible way to the expected shape of the surface, in a separate manner for each expected shape of the surface.

As a result of using a toroidal and/or astigmatic Fizeau element, a best-adapted toroidal and/or astigmatic Fizeau element can be designed for example for each surface to be measured, in particular for each free-form surface. As a result, the greatest free-form surface component of the surface to be measured can already be compensated for without additional testing optics and all that remains are higher-order components of the surface to be measured in the subaperture and a smaller component of astigmatism, which varies locally over the surface to be measured.

Provision can be made for the reference surface of the Fizeau element to have a toroidal embodiment.

A purely toroidal embodiment is advantageous in that it can be produced particularly easily.

In the case of a toroidal embodiment of the reference surface, provision can be made for the reference surface to have two toroidal radii running perpendicular to one another. In this context, the toroidal radii of the reference surface can be varied over a large range.

Provision can be made for the toroidal radii to be formed with at least approximate correspondence with the vertex radii of the surface to be measured. This enables a formation of subapertures which are configured larger in the region of the vertex and smaller in the region of edges. What can be achieved by a variation of the toroidal radii is that the subapertures can be formed to be larger in other regions of the surface and can be formed to be smaller in the region of a vertex.

It is advantageous if an overall number of subapertures or individual areas is determined such that, firstly, a measurement time is minimized and, secondly, a bandwidth, in particular a spatial frequency spectrum, is maximized. A compromise between the above-described parameters can be chosen so as to vary from task to task.

An astigmatic or purely astigmatic embodiment of the reference surface is advantageous in that this allows the reference surface to be calibrated particularly easily. An astigmatic surface is approximately invariant in relation to spherizations about the radius center. This enables an absolute calibration using a counter surface.

In particular, provision can be made for the toroidal and/or astigmatic reference surface to be absolutely calibrated apart from Zernike polynomials $Z1$ to $Z6$ by a shift-shift calibration.

In an advantageous development of the measurement apparatus according to the invention, provision can be made for the back side surface of the Fizeau element to be shaped such that the, preferably plane, illumination wave is incident at least approximately perpendicularly on the reference surface at each point of a cross section of the illumination wave.

To bring about a formation of the test wave with a non-spherical, in particular astigmatic and/or toroidal wavefront by way of the refractive Fizeau element, it is particularly advantageous if the illumination wave is incident perpendicularly on the reference surface. To achieve this, the back side surface is advantageously shaped accordingly. As a result of such an embodiment of the back side surface and the reference surface, the illumination wave can initially be transformed in a space-saving manner by way of the Fizeau element when passing through the back side surface, with the result that this wave is incident perpendicularly on the reference surface, and transformed into a non-spherical, in particular astigmatic and/or toroidal wavefront when passing through the reference surface.

A perpendicular incidence of the illumination wave on the reference surface further enables a correct superposition on the reference wave of the test wave returning from the surface to be measured, this test wave now being aligned at least approximately parallel to the reference wave following a renewed passage through the reference surface.

Especially when using an interferometric measuring method based on multi-fringe methods, provision can be made for a small, defined tilt or angle to be included or introduced between the reference wave and the test wave.

In an advantageous development of the measurement apparatus according to the invention, provision can be made for, at each point of a cross section of the illumination wave, the illumination wave to be incident on the back side surface of the Fizeau element at an angle of at least 0.1°, preferably at least 0.3° with respect to the surface normal.

An angle of incidence on the back side surface that deviates from the perpendicular is advantageous in that bothersome retroreflections from the back side surface are avoided. In this way, a wedge angle, significant for Fizeau interferometry, is introduced.

Provision can be made for the back side surface of the Fizeau element containing the toroidal reference surface to be shaped so that an incident plane illumination wave is perpendicular to the reference surface at each point of the beam cross section of the plane illumination wave. In particular, provision can be made for the incident beam to be perpendicular to the back side surface at no point within the beam cross section and for a certain minimum angle with respect to perpendicular incidence, in particular 0.3 degrees, not to be undershot. This may introduce a wedge angle for avoiding interfering reflections.

Provision can be made for, at each point of a cross section of the illumination wave, the illumination wave to be incident on the back side surface of the Fizeau element at an angle of between 0.1° and 45°, preferably between 1° and 10° with respect to the surface normal.

In an advantageous development of the measurement apparatus according to the invention, provision can be made for the stop device to comprise a circular stop with an adjustable diameter and/or a rectangular stop with adjustable side lengths and/or a multi-blade stop.

Provision can be made for the multi-blade stop to be in the form of a beam delimitation device which comprises a plurality of individual blades that can be displaced independently of, and preferably parallel to, one another in order to shape the subaperture.

The subaperture can be defined particularly easily with a circular stop. However, to completely register the surface to be measured, the subapertures or the individual areas to be measured must have a large overlap, and this may lead to a deterioration in the temporal efficiency.

Forming the subaperture using a rectangular stop with adjustable side lengths is advantageous in that the surface to be measured can easily be measured without gaps by way of the position of the rectangles and the size of the rectangles can be adapted particularly easily to the given size of the individual areas.

Further, a rectangular stop can be used to adapt the size of the subaperture in two dimensions, preferably depending on gradients of a residual wave in these two directions.

If the stop device has a variable field stop, preferably formed to be rectangular with independently adjustable side lengths, in the illumination device, then the illumination can be restricted to the region of the surface to be measured, that is to say to the individual area, and consequently the above-described interfering reflections can be avoided. In addition to the rectangular field stop, provision can be made for an iris diaphragm to be connected in series with the rectangular stop arranged in the vicinity of the latter, with the result that the measurement field shape can be optimized with an additional degree of freedom as a result of a combination of two stops.

An embodiment of the stop device as a multi-blade stop is advantageous in that the control device has a particularly large geometric freedom when defining the individual area to be measured, as a result of which the individual areas may adopt different geometric shapes in different regions of the surface to be measured. However, a greater overlap, compared with when the individual areas are shaped as rectangles, may be required to register the surface to be measured without gaps.

The stop device of the measurement apparatus may have a round field stop or preferably a rectangular field stop adjustable in two orthogonal directions, or it may have both stop types connected in series.

Provision can be made for the stop device to be optically imaged onto the test object and/or the surface of the test object. This allows a size of the illuminated region or the subaperture to be set. In particular, such imaging of the stop device onto the surface allows an adjustment of the size of the subaperture or the fully illuminated region in accordance with a gradient criterion.

In an advantageous development of the measurement apparatus according to the invention, provision can be made for the registration device to be configured to reconstruct the shape of the surface from the individual areas.

By way of example, the overall shape of the surface may be reconstructed from the registered shapes of the individual areas with a stitching method. Moreover, other interpolation methods and/or else machine learning may be used.

In an advantageous development of the measurement apparatus according to the invention, provision can be made for the control device to be configured to determine a number, a position, a shape and/or an overlap of the individual areas such that a measurement parameter is optimized.

Depending on the information to be registered in relation to the surface to be measured, the measurement parameter may have a different form.

The at least one measurement parameter can preferably be a measurement accuracy and/or a measurement speed and/or a luminous intensity, in particular at the individual area and/or at the registration device, and/or a measurement throughput.

In particular, the at least one measurement parameter can be a measurement accuracy of an overall surface shape of the surface to be measured.

Depending on the information to be registered in relation to the surface to be measured, the term "measurement parameter optimization" may also be understood differently.

By way of example, a large number of small individual areas which have a great overlap with one another may be advantageous for the purpose of obtaining a highly precise measurement of a surface that is difficult to measure, that is to say a surface which, in a small space, has significant deviations from an astigmatic and/or toroidal shape. This yields great redundancy in the registered information, as a result of which the surface can be determined very precisely. In this case, the measurement accuracy represents the optimized measurement parameter in relation to the surface to be measured.

In particular, the measurement accuracy can be determined by a gradient distribution in the individual area. By way of the size of the subapertures, it is possible in turn to adjust or minimize the maximum gradient in the measurement field.

In another example, provision can be made for the demands in relation to the resolution of the surface shape to be reduced for the benefit of temporal efficiency. In this case, the control device specifies large individual areas, with the result that the surface to be measured can be registered in full using only a few recordings. In this case, the optimization of the measurement relates to temporal efficiency and to a lesser extent to measurement accuracy.

In an advantageous development of the measurement apparatus according to the invention, provision can be made for the control device to be configured to determine the number, position and/or shape of the individual areas such that a greatest occurring gradient in the respective individual area does not exceed a limit gradient of 5 mrad, preferably 1 mrad, particularly preferably 0.5 mrad.

In particular, taking account of a limit gradient can be used as a criterion for the selection and definition of the individual areas. According to these criteria, the individual areas should be chosen so that the surface shape to be measured, in comparison with the incident shape of the test wave, has a gradient within the individual area of less than 5 mrad, preferably less than 1 mrad, particularly preferably less than 0.5 mrad.

Accordingly, the individual area is adapted in terms of its shape and position within a greatly varying expanse of the surface to be measured in such a way that it only still comprises a partial region which has a gradient that is less than the specified limit gradient. The further regions of the expanse to be measured are subsequently filled with further individual areas, which each in turn fulfil the limit gradient criterion.

Observing the above-described limit gradient criterion may in particular serve to avoid interfering reflections and excessive local interference fringe densities on a camera of the registration device. High local interference fringe densities may for example lead to significant retrace errors, and hence to reduced measurement accuracy.

Provision can be made for a maximum gradient of the wavefront difference between the test wave and the reference wave to be variable. The parameter of the gradient of the wavefront difference is directly correlated with a size of the subaperture or the individual area, in particular linearly to a first order in an X-direction and a Y-direction perpendicular to the X-direction and/or linearly to a first order with respect to a diameter of the subaperture. The parameter of the maximum gradient of the wavefront difference may further be adjusted individually for each subaperture by way of the stop device in the illumination device. As a result, the limit gradient and hence the size of the individual area or the subaperture can be balanced vis-à-vis measurement accuracy, in particular a non-correctable component of the retrace error.

Compared to apparatuses from the prior art in which subapertures or individual areas with a constant size are used, the measurement apparatus according to the invention is advantageous in that the field size or the subaperture can be adapted to a local maximum gradient. On account of a lack of adaptation option, most individual fields are unnecessarily small in the apparatus known from the prior art since the field size is given by a maximally occurring gradient at any point on the surface of the test object to be measured, especially following a tilt adjustment. Limiting the measurement field size or the size of the individual area or the size of the subaperture using a gradient criterion is advantageous because gradients that are too large cause large-area interfering reflections which may be superposed on the wavefront to be analysed and which may cause massive measurement errors.

One option for avoiding massive measurement errors as a result of gradients that are too large would lie in evaluating only a central region of the respective individual area and ignoring regions with gradients that are too large. Such a procedure can be improved by virtue of avoiding an illumination of regions with gradients that are too large because, as a result of an optical unit of the measurement apparatus, the test wave returning from those regions may also cause interferences on a camera chip of the registration device in a central region of the individual surface or the subaperture. In particular, such interferences may be substantially caused by a double reflection between the reference surface and the surface to be measured, this double reflection being reflected in the opposite direction to the reference tilt by the basic tilt between these two surfaces. Further, twice the asphericity in the individual area is impressed on the returning test wave on account of the twofold reflection at the surface of the test object occurring in the process.

In an advantageous development of the measurement apparatus according to the invention, provision may be made for a reduction device to be provided to reduce a spatial coherence of the illumination wave.

A reduction in the spatial coherence of the illumination wave may be advantageous for the purpose of avoiding interfering reflections since, as a result, interference phenomena only still occur within the spatial coherence length of the surface to be measured. By way of example, this may be given by a form of an illumination in a pupil of the interferometer device, which defines a secondary light source.

In particular, the above-described spatial coherence reduction reduces coherent interferences, which arise by way of a reflection and/or scattering at other optical surfaces of the interferometer device. Further, the above-described spatial coherence reduction also reduces large-area interferences which take a significantly different optical path to the registration device, in particular the camera, than the test object reflection or the test wave and/or the reference wave. By way of example, this may also be a twofold reflection from the surface to be measured.

In particular, provision can be made for the reduction device to comprise a plurality of reduction elements which bring about a different degree of coherence reduction of the illumination wave. The reduction elements may be selected and used on the basis of an expected deviation of the surface to be measured from the wavefront of the test wave.

In particular, the above-described reduction device can be configured to form a spatially extensive illumination setting in order to avoid coherent interferences.

The sought-after extensively planar illumination wave may advantageously be at least approximately homogenous within a given diameter, in particular within a maximum incoherent illumination pupil diameter to be used. Provision can be made for a design of the illumination device to be optimized in this respect. A homogenization of the illumination wave is implemented by a redistribution at the illumination source, in particular at a fibre output, of a Gaussian intensity of the illumination wave into an at least approximately top-hat or rectangular distribution. In this way, a light loss at an edge of the pupil can be avoided. In this respect, reference is made to document U.S. Pat. No. 3,476,463 in particular.

Provision can be made for a homogeneity of the illumination wave Ipv/Imax to be 1%, 5%, 10% or 20%. In this case, the homogeneity Ipv/Imax is determined as a ratio of a difference between a maximum and a minimum intensity (peak to valley intensity) and the maximum intensity, or this is expressed as a percentage. As an alternative or in addition, provision can be made for the homogeneity to be less than 20%, preferably less than 10%, particularly preferably less than 5%, very particularly preferably less than 1%.

Provision can be made for the reduction device to comprise a rotating diffusion plate and/or a rotating microlens array.

Provision can be made for the rotating microlens array to be configured to form a secondary illumination source for forming the illumination wave.

Provision can be made for the reduction device to comprise a pivoting-in optical unit with a lens element group. By pivoting the pivoting-in optical unit in and/or out, it is possible to switch between a spatially coherent and a spatially partly coherent illumination of the surface.

By pivoting in the lens element group using the pivoting-in optical unit, it is possible to switch from a coherent focus to a planar illumination, with relatively small beam deviations being uncritical in the case of a planar illumination. As a result, a coherent focus position remains uninfluenced by the switching mechanism and stable. In particular, provision can be made for the illumination device to be optimized for a state with a pivoted-out pivoting-in optical unit and hence for a state of coherent illumination since beam deviations caused by pivoting in the pivoting-in optical unit are less critical.

Provision can be made for the reduction device to comprise a diffusor and/or for a pivoting-in optical unit to also comprise a diffusor.

Provision can be made for the pivoting-in optical unit to be configured to transform imaging properties of the illumination device. In particular, provision can be made for the pivoting-in optical unit to transform point-to-point imaging, in particular imaging implemented from the illumination source to an illumination pupil of the illumination device, to imaging implemented from a point to infinity.

Provision can be made for the illumination device to comprise a preferably switchable transmission mask device having one or more illumination mask elements, which are preferably arranged interchangeably in an illumination pupil of the measurement apparatus.

In this case, the respectively chosen illumination mask element forms a secondary illumination source, the precise appearance of which is determined by an embodiment of the illumination mask elements.

Provision can be made for the reduction device to be provided only in some embodiments of the measurement apparatus.

In an advantageous development of the measurement apparatus according to the invention, provision can be made for all optical components of the measurement apparatus to be in the form of reflective and/or refractive components.

An embodiment of the optical components of the measurement apparatus as reflective and/or refractive components enables particularly high light efficiency and hence signal strength of the illumination wave, the reference wave and the test wave. As a result, when weaker illumination sources and/or shorter exposure times are used, more reliable information in relation to the shape of the surface can be determined than in the case where diffractive components are used.

As a result of providing only reflective and/or refractive components, it is possible to increase an available amount of light in comparison with systems used in the prior art. Dispensing with diffractive components, in particular multiply encoded computer-generated holograms for the whole-area testing of free-form surfaces in a test tower, which generate a large light loss, increases the amount of light available. As a result, the desired extensive illumination settings can be generated very easily from an optical point of view, for example by way of large-area illumination of a diffusion plate, which may have a transmission of Sigma=0.5, for example. Further, simple masking in an intermediate image of a secondary light source, for example formed by a rotating microlens array, is made possible.

In an advantageous development of the measurement apparatus according to the invention, provision can be made for the positioning device to have six degrees of freedom.

If the positioning device has six degrees of freedom and/or if the positioning device is in the form of a 6-axis robot, then the interferometer device can be arranged in any desired orientation and in any desired position vis-à-vis the surface to be measured. This enables a targeted alignment of the test wave on the optical surface to be measured.

By way of a 6-axis robot, the interferometer device, in particular the splitting element, can be particularly advantageously positioned such that a, preferably toroidal, wavefront of the test wave incident on the surface to be measured, in particular on the individual area, is substantially perpendicular to the individual area (apart from a maximum local gradient to be defined). The azimuthal orientation of the Fizeau element can be adjusted by the 6-axis robot such that the basic astigmatism of the individual area, in particular of a free-form surface, can be optimally compensated by an astigmatism of the reference surface of the Fizeau element or the Fizeau surface, that is to say the astigmatism of the Fizeau element has substantially the same orientation as the basic astigmatism of the free-form surface to be measured or of the individual area. In this case, it may be provided or is advantageous if all azimuthal orientations of the Fizeau element or of the test wave are adjustable in an angular range of +/−90 degrees about a chief ray of the test wave.

Provision can be made for the positioning device to be configured to jointly position the illumination device, the registration device and the interferometer device relative to the test object along six degrees of freedom such that the illumination device, the registration device and the interferometer device remain arranged relative to one another in the same way.

As an alternative or in addition, provision can be made for the positioning device to be configured to merely position the splitting element and/or the interferometer device relative to the test object along six degrees of freedom, wherein a beam steering device may be provided in order to suitably steer the illumination wave to the splitting element, even in the case of changing locations and alignments of the splitting element, especially under the above-described angles.

Provision can be made for the positioning device to be configured to position the reference surface spaced apart at a constant working distance of 0.1 cm to 10 cm, preferably 0.5 cm to 3 cm, particularly preferably 1.5 cm to 2.5 cm, from the surface of the test object. As a result of such a short cavity length between the reference surface and the surface to be measured, it is possible for example to set significantly larger area illumination settings in comparison with the prior art. As a result, a very high suppression factor for coherent interferences can be obtained.

In an advantageous development of the measurement apparatus according to the invention, provision can be made for the splitting element and/or the positioning device to be designed such that, at each point of a cross section of the test wave, the test wave is incident at least approximately perpendicularly on the surface to be measured.

An incidence of the test wave on the optical surface to be measured which is as perpendicular as possible enables a reliable interferometric measurement of the surface to be measured. In order to obtain an incidence which is as perpendicular as possible, the splitting element may be configured to form a test wave which is adapted as far as possible to the surface to be measured. Further, provision can be made for the positioning device to be configured to align, relative to the measuring surface, the test wave adapted to the surface to be measured.

Provision can be made for a set of splitting elements, in particular Fizeau elements, to be available as part of the measurement apparatus, the splitting elements of this set each being capable of forming different astigmatic and/or toroidal test wavefronts. Depending on the optical surface to be measured, in particular on an expected basic shape of the surface to be measured, the positioning device and/or an interchange device to be provided to this end, for example, may be configured to select a suitable splitting element and use it for measuring the surface.

In the method according to the invention for measuring a shape of a surface of a test object, in particular an optical surface of an optical element, by interferometry, provision is made for an illumination wave to be split into a test wave which is directed at the surface and a reference wave with a splitting element, whereby the returning test wave which has interacted with the surface to be measured is combined with the reference wave and an interference pattern is generated, whereby the interference pattern is evaluated in order to determine a deviation of the shape of the surface to be measured from a target shape, whereby the surface to be measured is split into a plurality of individual areas to be measured in succession, whereby the test wave is positioned on the surface to be measured such that the respective individual area is illuminated in full in at least approximately perpendicular fashion. According to the invention, to illuminate the individual areas, provision is made for a subaperture which defines the size of the test wave to be adapted to the individual area to be measured in each case.

The method according to the invention is advantageous in that, by adapting the size of the test wave to the individual area to be measured, it is possible to account for a measurability of the surface to be measured in the region of the respective individual area. This allows a temporally efficient and precise registration of the entire surface with a high luminous intensity.

In an advantageous development of the method according to the invention, provision may be made for a non-spherical wavefront of the test wave, which is adapted to the target shape of the individual area to be measured, to be formed by the splitting element.

This development is advantageous in that the formation of a non-spherical wavefront of the test wave already allows the latter to be adapted to the measuring surface. This allows an even more temporally efficient and even more precise registration of the entire surface with a high luminous intensity.

Provision can be made for the surface to be measured to be subdivided into a plurality of individual areas to be successively measured in such a way that the size, number, position and the overlap of the individual areas to be measured is selected on the basis of a deviation of the surface to be measured in the region of the individual area from the non-spherical form of the wavefront of the test wave.

Provision can be made for the subaperture to be arranged and formed by at least one variable field stop in an illumination system of an interferometric sensor, wherein a partial illumination of the surface to be measured is made possible with the variable field stop.

Provision can be made for the positioning device to be embodied as a 6-axis robot or 6-axis positioning machine, which is able to position the interferometer device at each point of the surface to be measured, in such a way that the toroidal and/or astigmatic wavefront of the test wave incident on the surface is substantially perpendicular to the surface to be measured.

Provision can be made for the toroidal and/or astigmatic wavefront incident on the surface to be measured to be perpendicular to the surface to be measured, up to a maximum local gradient to be defined.

Provision can be made for an azimuthal orientation of the Fizeau element to be adjustable by the positioning device such that a basic astigmatism of the surface to be measured is optimally compensated by an astigmatism of the reference surface.

In particular, provision can be made for the reference surface to be positionable by the positioning device such that the astigmatism of the reference surface has substantially the same orientation as a basic astigmatism of a surface to be measured.

It is advantageous if all azimuthal orientations of the interferometer device about a chief ray of the illumination wave and/or the test wave are adjustable in an angular range from −90 degrees to +90 degrees.

In an advantageous development of the method according to the invention and in an advantageous development of the measurement apparatus according to the invention, provision can be made for the shape of the surface to be reconstructed from the individual areas.

A reconstruction of the shape of the surface from the individual areas allows global information in relation to the surface to be determined from individual information in relation to the individual areas.

The method according to the invention is particularly suitable for the whole-area measurement of free-form surfaces, in particular surfaces of mirrors of EUV projection exposure apparatuses, by means of a subaperture stitching method. In particular, it is possible through the method according to the invention to achieve measurement accuracy of 8 picometres to 12 picometres for variations in the surface to be measured in a band from 0.1 mm to 50 mm spatial wavelength.

Provision can be made for the individual subapertures or the individual areas to be significantly smaller in this case than a free diameter of the surface to be measured in each case. A high spatial resolution can be achieved as a result.

Compared to methods known from the prior art, the method according to the invention has the advantage of an improved spatial resolution since the individual areas or subapertures are significantly smaller than a free diameter of the surface to be examined, in particular of a free-form surface.

Further, the method according to the invention obtains an elevated spatial resolution since distortion effects are less pronounced.

A further advantage of the method according to the invention lies in the avoidance of interfering reflections which may generate high-frequency wavefront aberrations. If the method according to the invention or the measurement apparatus according to the invention dispenses with the use of computer-generated holograms and if the use of surfaces which are oriented perpendicular to the incident illumination wave at any point within the beam cross section is avoided, then it is possible to efficiently reduce interfering reflections.

Further, the use of measurement structures with long cavity lengths and/or different distances can be avoided or reduced in the method according to the invention, especially when measuring the optical surface for errors with a medium and high spatial frequency.

Test geometries or measurement structures with a small distance between the surface to be examined, in particular an asphere to be tested, and an associated interferometric reference surface, that is to say test geometries or measurement structures with a short cavity length, have a number of advantages. A first advantage lies in the fact that there are only small interferences due to air streaks. A further advantage consists in the fact that a calibration mirror may generally have the same working distance as the test object in the case of such test geometries or measurement structures with a short cavity length. As a result, it is possible to avoid errors due to speckle propagation effects and due to differently sharp imaging of optical surfaces of the interferometer device or the interferometric sensor onto the registration device, in particular the interferometer camera, during calibration.

As a result of the method according to the invention, it is further possible to avoid the use of computer-generated holograms and hence the occurrence of interfering reflections caused by higher orders of diffraction of the computer-generated hologram. This in turn may lead to an advantageous reduction of phase errors when measuring the optical surface.

By avoiding such measurement structures, it is also possible to avoid errors due to speckle propagation effects or blurring of writing strips of the computer-generated holograms since a calibration of the reference surface is implemented at the same distance as the test object measurement itself. If the distance is chosen to be small and constant then there is particularly effective error avoidance.

A further advantage of the method according to the invention and of the measurement apparatus according to the invention lies in the possibility of implementation in a standard ambient atmosphere, in particular the possibility of dispensing with a vacuum, with accuracies down to a few picometres being able to be achieved even in the case of the implementation under a standard ambient atmosphere.

In particular, provision can be made for the reference surface to be formed in stable and absolutely calibratable fashion and for there to be no further compensation optical unit, which could introduce interferences into the interferometric phase measurement, arranged between the reference surface and the surface to be measured. Accordingly, provision can be made for the test wave to propagate freely between the reference surface and the surface to be measured.

In an advantageous development of the method according to the invention, provision can be made for a set of interchangeable splitting elements to be provided for measuring the surface of the test object, the splitting elements of the set being embodied in a manner adapted to the individual area of the surface of the test object to be measured in such a way that a splitting element which is adapted to the target shape of the individual area to be measured is available for each of the individual areas, and a splitting element which is adapted to the target shape of the individual area being selected from the set for the purpose of measuring each individual area.

By providing a set of splitting elements and suitably selecting the respectively best-adapted splitting element, it is possible in particular to particularly efficiently measure surfaces to be measured which have different dominating basic shapes in different regions. These different dominating basic shapes can be approximated particularly well by the test waves formed by the various splitting elements, provided the splitting element is chosen in accordance with the region of the surface to be measured in which the individual area to be measured in each case is located.

At a reference surface of the splitting element, provision can be made for a portion of the illumination wave to be transmitted as the test wave and a portion of the illumination wave to be reflected as the reference wave in an advantageous development of the method according to the invention. Forming the test wave and the reference wave at a reference surface of the splitting element using transmission and reflection enables the generation of test waves and reference waves with a high luminous intensity while incurring a small loss of light and little expense.

In an advantageous development of the method according to the invention, provision can be made for the splitting element to be positioned at a distance of 0.1 cm to 10 cm, preferably from 0.5 cm to 3 cm, particularly preferably from 1.5 cm to 2.5 cm, from the surface.

By way of example, a small distance between the splitting element and the surface allows a reduction of the spatial coherence of the illumination wave, whereby reflections of uninvolved regions further away are advantageously interferometrically masked in a certain sense, as a result of which an improved interferometric signal arises.

For the whole-area measurement of the surface and/or the figure of the test object, provision can be made for an interferometric sensor for the individual subapertures to be positioned at a fixed working distance. In the process, provision can be made for the test wave to strike the surface as perpendicularly as possible. In particular, the interferometric sensor or interferometer device may be positioned on the separate individual areas via a 6 DOF (degree of freedom) positioning machine or a 6-axis robot.

A wavefront shape of the test wave reflected by the individual area in each case depends very strongly here on a local surface shape and may vary significantly over the entire surface.

In the case of the aforementioned distances, air streaks only have a small influence on the propagation of the test waves.

In an advantageous development of the method according to the invention, provision can be made for the splitting element to be embodied as a Fizeau element.

Embodying the splitting element as a Fizeau element is advantageous in that this allows methods of Fizeau interferometry to be used, and these enable a particularly space-saving and reliable measurement of the surface.

In an advantageous development of the method according to the invention, provision can be made for the reference surface to be embodied to be adapted to the target shape of the surface of the test object to be measured.

Provision can be made for the reference surface of the Fizeau element to have a toroidal and/or astigmatic embodiment.

The use of interchangeable Fizeau elements with a toroidal and/or astigmatic reference surface may be provided. Advantageously, the Fizeau elements can be adapted in terms of their toroidal radii to the test object to be measured, in particular a free-form surface.

Adapting the reference surface of the Fizeau element to the target shape of the surface to be measured is advantageous in that, as a result, the wavefront of the test wave receives a shape geometrically similar to the shape of the surface to be measured.

In an advantageous development of the method according to the invention, provision can be made for an astigmatic and/or toroidal wavefront of the test wave to be formed.

An astigmatic and/or toroidal wavefront of the test wave is advantageous in that it already corresponds to a significant degree to a geometric shape of mirrors, in particular mirrors of EUV projection exposure apparatuses.

At each location of the respective individual areas, provision can be made for the test wave to be guided as parallel as possible with respect to a local mean surface normal and/or as perpendicular as possible with respect to the surface in an advantageous development of the method according to the invention.

An incidence as perpendicular as possible with respect to the surface should be understood to mean an incidence of the test wave in which the unavoidable local deviations from a perpendicular incidence on the surface are minimized. The deviations are always unavoidable if the target shape deviates from the wavefront shape of the test wave.

An incidence as parallel as possible with respect to a local mean surface normal should be understood to mean an incidence of the test wave on the surface such that, within certain surroundings, for example in an area of 10 mm×10 mm or more, the deviation of the direction of incidence of the test wavefront from the average surface normal is minimized in this area.

To measure the individual areas, provision can be made for an illumination device forming the illumination wave, an interferometer device forming the reference wave and the test wave, and a registration device registering an interference pattern to be positioned relative to the surface in such a way that the test wave strikes the surface as perpendicularly as possible in an advantageous development of the method according to the invention.

An application of the method according to the invention to the determination of a surface shape is particularly advantageous, with the surface shape arising from a basic shape and a modulation applied to the basic shape. The application of the method to a shape of the surface, wherein the basic shape is known while the modulation should be determined by the method, is particularly advantageous. In this case, the non-spherical wavefront of the test wave can be formed in a manner adapted to the basic shape known in advance. If the modulation in comparison with the basic shape introduces only small deviations on the surface, then these can be determined particularly quickly, easily and reliably using the method.

An application of the method to surface shapes of the surface where the basic shape has an astigmatic form is particularly advantageous. Further, provision can be made for the modulation to have a gradient in relation to the basic shape of less than 5 mrad, preferably less than 1 mrad, particularly preferably less than 0.5 mrad, within an individual area, with the modulation likewise being known in advance. This is advantageous in that all that can be used to measure the entire surface is a splitting element adapted to the basic shape of the surface or a test wave adapted to the basic shape of the surface, while minor modulations can be interferometrically quantified and verified in terms of their correctness by the method.

In an advantageous development of the method according to the invention, provision can be made for the subaperture to be defined by the stop device with a circular stop having an adjustable diameter and/or a rectangular stop with adjustable side lengths and/or a multi-blade stop.

A multiplicity of geometric shapes for the subaperture can be defined by the aforementioned embodiments of the stop devices, whereby, in particular, observing the limit gradient criterion described hereinbelow is enabled in a simple manner.

The prior art has disclosed the practice of generating a ring-shaped illumination using a diffractive element.

The method according to the invention can be developed by virtue of a plurality of rings and/or a plurality of regions deviating slightly from the ring shape being generated simultaneously by one or more stops, in particular by one or more illumination mask elements.

In this case, the illumination mask element forms a secondary light source, the precise appearance of which is determined by an embodiment of the illumination mask elements.

In this case, a realizable intensity of at least 500 mW at the illumination source, in particular at a fibre output, in particular at an input of the illumination device, enables a realization of the above-described meaningful illumination settings to be used, since the light loss accompanying the stopping down can be compensated by the high input intensity.

Since, as described further above, the working distance or the cavity lengths are preferably designed between 0.1 mm and 100 mm, preferably between 0.1 mm and 20 mm, particularly preferably between 1 mm and 5 mm, the transmitting regions in the illumination mask elements can be designed to be relatively large without a contrast becoming poorer.

In an advantageous development of the method according to the invention, provision can be made for a number, a position, a shape and/or an overlap of the separate individual areas to be determined such that a measurement parameter is optimized.

By way of example, an optimization of the measurement parameter can be understood to mean an optimization of a luminous intensity of the returning and recorded test wave, an optimization of the recording speed or measurement duration for the surface and/or an optimization of a measurement accuracy.

In an advantageous development of the method according to the invention, provision can be made for the number, position and/or shape of the individual areas to be determined such that a greatest occurring gradient in the respective individual area does not exceed a limit gradient of 5 mrad, preferably 1 mrad, particularly preferably 0.5 mrad.

If exceeding a limit gradient is avoided, then it is possible to obtain a data quality registered within the individual area. An interferometric determination of the deviation of the modulation from the basic shape or an interferometric determination of the deviation of the surface shape from the shape of the test wave is made more difficult if the limit gradient is exceeded, provided the test wave is adapted to a basic shape of the optical surface. It is therefore the object of the above-described method step to limit the deviations to an interferometrically reliably determinable amount by restricting the extent of the individual area.

The above-described method according to the invention and the above-described measurement apparatus according to the invention in particular allow a whole-area figure measurement of free-form surfaces for optical elements for EUV lithography with a high spatial resolution. In particular, the method according to the invention and the measurement apparatus according to the invention can achieve improvements in the spatial resolution in comparison with a test system measuring over the whole area, and improvements in the processing process.

The use of a pivoting-in optical unit allows switching between a coherent and an incoherent illumination by pivoting-in or pivoting-out a lens element group, and consequently it is possible to make do without the use of a second independent illumination system.

In the processing method according to the invention for processing a test object, in particular an optical element, in particular for a lithography system, in particular for a projection exposure apparatus for semiconductor lithography, a shape of a surface of the test object, in particular an optical surface of the optical element is processed such that the shape of the surface is at least approximated to a target shape. According to the invention, provision is made for the shape of the surface to be determined by the above-described measurement apparatus according to the invention or any of its preferred embodiments and/or using the above-described method according to the invention or any of its embodiments.

The processing method is particularly suitable for the processing of optical elements and for EUV projection exposure apparatuses.

The processing method according to the invention is advantageous in that an iterative processing of the test object or the surface can be carried out particularly reliably and quickly by way of the particularly precise and quick measurement using the measurement apparatus according to the invention and/or the method according to the invention. This enables a time-efficient and cost-efficient production of highly precisely shaped optical elements, in particular of mirrors for the EUV projection exposure apparatuses.

In an advantageous development of the processing method according to the invention, provision can be made for the processing method to be carried out in one or more processing steps and for the shape of the surface to be determined after each processing step.

An iterative determination of the shape of the surface after and/or before each processing step is advantageous in that the processing step following the determination of the surface can be adapted to the information obtained during the determination of the shape of the surface.

In an advantageous development of the processing method according to the invention, provision can be made for the processing method of the subsequent processing step to be determined on the basis of the determined shape of the surface.

A selection of the processing method on the basis of the determined shape is advantageous in that, for example, a strongly modifying processing method can be chosen in the case of a significant deviation of the determined shape of the surface from the target shape. This enables a time-efficient and cost-efficient manufacture of optical elements.

In an advantageous development of the processing method according to the invention, provision can be made for the processing method to be a polishing method.

A polishing method is particularly suitable for large-scale surface processing, which can be resolved and registered with the measurement apparatus according to the invention and/or via the method according to the invention.

As a result of the processing method according to the invention, it is possible in particular to avoid a smoothing process used in the general prior art, through which the surface can be processed without deterministic correction in a bandwidth of 1 mm to 10 mm spatial wavelength.

In the optical element according to the invention, in particular for a lithography system, in particular for a projection exposure apparatus for semiconductor lithography, provision is made for the surface of the optical element to be measured using a measurement apparatus according to the invention or any of the preferred embodiments of the measurement apparatus according to the invention and/or using the method according to the invention or any of the preferred embodiments of the method according to the invention, and/or is processed using the above-described processing method according to the invention or any of the preferred embodiments.

The optical element according to the invention is advantageous in that it has a highly precise, formed optical surface and simultaneously is produced in cost-effective and time-efficient fashion.

In particular, the optical element can be a mirror for an EUV projection exposure apparatus.

The lithography system according to the invention, in particular a projection exposure apparatus for semiconductor lithography, comprises an illumination system with a radiation source and an optical unit which comprises at least one optical element. According to the invention, provision is made for at least one of the optical elements to comprise an optical surface which is measured at least in part with the above-described measurement apparatus according to the invention or any of the preferred embodiments of the measurement apparatus according to the invention and/or via the above-described method according to the invention or any of the preferred embodiments of the method according to the invention, and/or for at least one of the optical elements to be processed through the above-described processing method according to the invention or any of the preferred embodiments of the above-described processing method, and/or for at least one of the optical elements to be an above-described optical element according to the invention.

The lithography system according to the invention is advantageous in that it enables a reliable and highly precise exposure of wafers by virtue of the optical elements of the lithography system having been measured and/or processed particularly precisely. At the same time, the lithography system according to the invention has a particular cost advantage as a result of the efficient manufacture of the optical elements used therein.

Features described in conjunction with one of the subjects of the invention, specifically given by the measurement apparatus according to the invention, the method according to the invention, the processing method according to the invention, the optical element according to the invention and the lithography system according to the invention, are also advantageously implementable for the other subjects of the invention. Likewise, advantages specified in conjunction with one of the subjects of the invention can also be understood in relation to the other subjects of the invention.

In addition, it should be noted that expressions such as "comprising", "having" or "with" do not exclude any other features or steps. Furthermore, expressions such as "a" or "the" that refer in the singular to steps or features do not exclude a plurality of features or steps—and vice versa.

In a puristic embodiment of the invention, it may however also be provided that the features introduced in the invention by the expressions "comprising", "having" or "with" constitute an exhaustive list. Accordingly, in the context of the invention, one or more lists of features can be considered in self-contained form, for example respectively for each claim.

Note that terms such as "first" or "second" etc. are used predominantly for the sake of distinguishability between respective device or method features, and are not imperatively intended to indicate that features are mutually dependent or relate to one another.

Exemplary embodiments of the invention will be described in more detail below with reference to the drawing.

The figures each show preferred exemplary embodiments in which individual features of the present invention are illustrated in combination with one another. Features of one exemplary embodiment may also be implemented separately from the other features of the same exemplary embodiment, and may accordingly be readily combined by an expert to form further useful combinations and sub-combinations with features of other exemplary embodiments.

Elements of identical function are denoted by the same reference designations in the figures.

DETAILED DESCRIPTION

Figure 1:
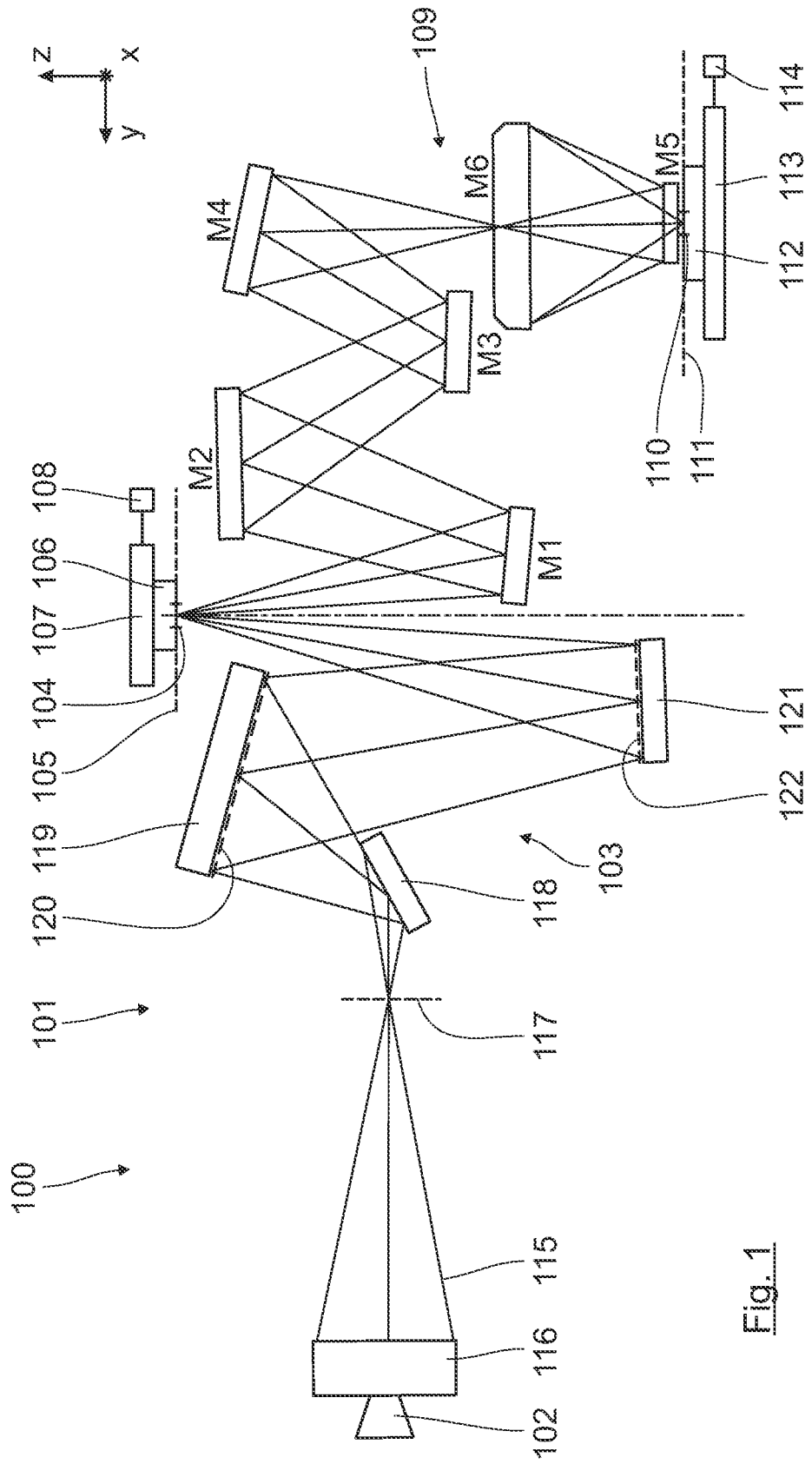
FIG. 1 shows a meridional section of an EUV projection exposure apparatus.

With reference to FIG. 1, the essential components of a microlithographic EUV projection exposure apparatus 100 as an example of a lithography system are initially described below in exemplary fashion. The description of the basic structure of the EUV projection exposure apparatus 100 and of the components thereof should not be interpreted restrictively here.

An illumination system 101 of the EUV projection exposure apparatus 100 comprises, besides a radiation source 102, an illumination optical unit 103 for the illumination of an object field 104 in an object plane 105. What is exposed here is a reticle 106 arranged in the object field 104. The reticle 106 is held by a reticle holder 107. The reticle holder 107 is displaceable in particular in a scanning direction by way of a reticle displacement drive 108.

In FIG. 1, a Cartesian xyz-coordinate system is plotted to aid the explanation. The x-direction runs perpendicularly into the plane of the drawing. The y-direction runs horizontally, and the z-direction runs vertically. In FIG. 1, the scanning direction runs in the y-direction. The z-direction runs perpendicular to the object plane 105.

The EUV projection exposure apparatus 100 comprises a projection optical unit 109. The projection optical unit 109 serves for imaging the object field 104 into an image field 110 in an image plane 111. The image plane 111 extends parallel to the object plane 105. Alternatively, an angle that differs from 0° between the object plane 105 and the image plane 111 is also possible.

A structure on the reticle 106 is imaged onto a light-sensitive layer of a wafer 112 arranged in the region of the image field 110 in the image plane 111. The wafer 112 is held by a wafer holder 113. The wafer holder 113 is displaceable in particular in the y-direction by way of a wafer displacement drive 114. The displacement, firstly, of the reticle 106 by way of the reticle displacement drive 108 and, secondly, of the wafer 112 by way of the wafer displacement drive 114 can be implemented so as to be mutually synchronized.

The radiation source 102 is an EUV radiation source. The radiation source 102 emits, in particular, EUV radiation 115, which is also referred to below as used radiation, illumination radiation or projection radiation. In particular, the used radiation 115 has a wavelength in the range between 5 nm and 30 nm. The radiation source 102 can be a plasma source, for example an LPP source ("laser produced plasma") or a GDPP source ("gas discharged produced plasma"). It may also be a synchrotron-based radiation source. The radiation source 102 can be a free electron laser (FEL).

The illumination radiation 115 emerging from the radiation source 102 is focused by a collector 116. The collector 116 may be a collector with one or more ellipsoidal and/or hyperboloidal reflection surfaces. The at least one reflection surface of the collector 116 can be impinged upon by the illumination radiation 115 with grazing incidence (GI), which is to say with angles of incidence greater than 45°, or with normal incidence (NI), which is to say with angles of incidence less than 45°. The collector 116 can be structured and/or coated, firstly, for optimizing its reflectivity for the used radiation 115 and, secondly, for suppressing extraneous light.

Downstream of the collector 116, the illumination radiation 115 propagates through an intermediate focus in an intermediate focal plane 117. The intermediate focal plane 117 can represent a separation between a radiation source module, having the radiation source 102 and the collector 116, and the illumination optical unit 103.

The illumination optical unit 103 comprises a deflection mirror 118 and, arranged downstream thereof in the beam path, a first facet mirror 119. The deflection mirror 118 may be a plane deflection mirror or, alternatively, a mirror with a beam-influencing effect going beyond a pure deflection effect. As an alternative or in addition, the deflection mirror 118 may be in the form of a spectral filter that separates a used light wavelength of the illumination radiation 115 from extraneous light of a wavelength deviating therefrom. If the first facet mirror 119 is arranged in a plane of the illumination optical unit 103 that is optically conjugate to the object plane 105 as a field plane, it is also referred to as a field facet mirror. The first facet mirror 119 comprises a multiplicity of individual first facets 120, which are also referred to below as field facets. Only a few of these facets 120 are illustrated in FIG. 1 in exemplary fashion.

The first facets 120 can be embodied in the form of macroscopic facets, in particular in the form of rectangular facets or in the form of facets with an arcuate peripheral contour or a peripheral contour of part of a circle. The first facets 120 may be embodied as plane facets or alternatively as convexly or concavely curved facets.

As is known for example from DE 10 2008 009 600 A1, the first facets 120 themselves can also each be composed of a multiplicity of individual mirrors, in particular a multiplicity of micromirrors. The first facet mirror 119 may in particular be in the form of a microelectromechanical system (MEMS system). For details, reference is made to DE 10 2008 009 600 A1.

The illumination radiation 115 travels horizontally, that is to say in the y-direction, between the collector 116 and the deflection mirror 118.

In the beam path of the illumination optical unit 103, a second facet mirror 121 is arranged downstream of the first facet mirror 119. Provided the second facet mirror 121 is arranged in a pupil plane of the illumination optical unit 103, it is also referred to as a pupil facet mirror. The second facet mirror 121 can also be arranged at a distance from a pupil plane of the illumination optical unit 103. In this case, the combination of the first facet mirror 119 and the second facet mirror 121 is also referred to as a specular reflector. Specular reflectors are known from US 2006/0132747 A1, EP 1 614 008 B1, and U.S. Pat. No. 6,573,978.

The second facet mirror 121 comprises a plurality of second facets 122. In the case of a pupil facet mirror, the second facets 122 are also referred to as pupil facets.

The second facets 122 may likewise be macroscopic facets, which may for example have a round, rectangular or else hexagonal boundary, or may alternatively be facets composed of micromirrors. In this regard, reference is likewise made to DE 10 2008 009 600 A1.

The second facets 122 may have plane reflection surfaces or alternatively reflection surfaces with a convex or concave curvature.

The illumination optical unit 103 consequently forms a double-faceted system. This basic principle is also referred to as fly's eye integrator.

It can be advantageous to arrange the second facet mirror 121 not exactly in a plane that is optically conjugate to a pupil plane of the projection optical unit 109.

With the aid of the second facet mirror 121, the individual first facets 120 are imaged into the object field 104. The second facet mirror 121 is the last beam-shaping mirror or indeed the last mirror for the illumination radiation 115 in the beam path upstream of the object field 104.

In a further embodiment (not shown) of the illumination optical unit 103, a transfer optical unit contributing in particular to the imaging of the first facets 120 into the object field 104 may be arranged in the beam path between the second facet mirror 121 and the object field 104. The transfer optical unit can comprise exactly one mirror or, alternatively, two or more mirrors, which are arranged in succession in the beam path of the illumination optical unit 103. In particular, the transfer optical unit can comprise one or two mirrors for normal incidence (NI mirror, "normal incidence" mirror) and/or one or two mirrors for grazing incidence (GI mirror, "grazing incidence" mirror).

In the embodiment shown in FIG. 1, the illumination optical unit 103 comprises exactly three mirrors downstream of the collector 116, specifically the deflection mirror 118, the field facet mirror 119 and the pupil facet mirror 121.

The deflection mirror 118 can also be dispensed with in a further embodiment of the illumination optical unit 103, and so the illumination optical unit 103 can then have exactly two mirrors downstream of the collector 116, specifically the first facet mirror 119 and the second facet mirror 121.

The imaging of the first facets 120 into the object plane 105 using the second facets 122 or using the second facets 122 and a transfer optical unit is, as a rule, only approximate imaging.

The projection optical unit 109 comprises a plurality of mirrors Mi, which are numbered in accordance with their arrangement in the beam path of the EUV projection exposure apparatus 100.

In the example illustrated in FIG. 1, the projection optical unit 109 comprises six mirrors M1 to M6. Alternatives with four, eight, ten, twelve or any other number of mirrors Mi are likewise possible. The penultimate mirror M5 and the last mirror M6 each have a passage opening for the illumination radiation 115. The projection optical unit 109 is a doubly obscured optical unit. The projection optical unit 109 has an image-side numerical aperture which is greater than 0.5 and which can also be greater than 0.6 and, for example, can be 0.7 or 0.75.

Reflection surfaces of the mirrors Mi can be in the form of free-form surfaces without an axis of rotational symmetry.

Alternatively, the reflection surfaces of the mirrors Mi can be designed as aspherical surfaces with exactly one axis of rotational symmetry of the reflection surface shape. Just like the mirrors of the illumination optical unit 103, the mirrors Mi can have highly reflective coatings for the illumination radiation 115. These coatings can be designed as multilayer coatings, in particular with alternating layers of molybdenum and silicon.

The projection optical unit 109 has a large object-image offset in the y-direction between a y-coordinate of a center of the object field 104 and a y-coordinate of the center of the image field 110. This object-image offset in the y-direction can be of approximately the same magnitude as a z-distance between the object plane 105 and the image plane 111.

In particular, the projection optical unit 109 can have an anamorphic embodiment. In particular, it has different imaging scales βx, βy in the x- and y-directions. The two imaging scales βx, βy of the projection optical unit 109 are preferably (βx, βy)=(+/−0.25, +/−0.125). A positive imaging scale β means imaging without image inversion. A negative sign for the imaging scale β means imaging with image inversion.

The projection optical unit 109 consequently leads to a reduction in size with a ratio of 4:1 in the x-direction, which is to say in a direction perpendicular to the scanning direction.

The projection optical unit 109 leads to a reduction in size of 8:1 in the y-direction, which is to say in the scanning direction.

Other imaging scales are likewise possible. Imaging scales with the same signs and the same absolute values in the x-direction and y-direction are also possible, for example with absolute values of 0.125 or 0.25.

The number of intermediate image planes in the x-direction and in the y-direction in the beam path between the object field 104 and the image field 110 can be the same or can differ depending on the embodiment of the projection optical unit 109. Examples of projection optical units with different numbers of such intermediate images in the x- and y-directions are known from US 2018/0074303 A1.

In each case one of the pupil facets 122 is assigned to exactly one of the field facets 120 for forming in each case an illumination channel for illuminating the object field 104. In particular, this can yield illumination according to the Köhler principle. The far field is decomposed into a multiplicity of object fields 104 with the aid of the field facets 120. The field facets 120 generate a plurality of images of the intermediate focus on the pupil facets 122 respectively assigned thereto.

By way of an assigned pupil facet 122, the field facets 120 are imaged in each case onto the reticle 106 in a manner overlaid on one another for the purpose of illuminating the object field 104. The illumination of the object field 104 is in particular as homogeneous as possible. It preferably has a uniformity error of less than 2%. Field uniformity can be attained by overlaying different illumination channels.

The illumination of the entrance pupil of the projection optical unit 109 can be defined geometrically by way of an arrangement of the pupil facets. The intensity distribution in the entrance pupil of the projection optical unit 109 can be set via the selection of the illumination channels, in particular the subset of the pupil facets which guide light. This intensity distribution is also referred to as illumination setting.

A likewise preferred pupil uniformity in the region of sections of an illumination pupil of the illumination optical unit 103 that are illuminated in a defined manner can be achieved by a redistribution of the illumination channels.

Further aspects and details of the illumination of the object field 104 and in particular of the entrance pupil of the projection optical unit 109 are described hereinbelow.

The projection optical unit 109 may in particular have a homocentric entrance pupil. The latter can be accessible. It can also be inaccessible.

The entrance pupil of the projection optical unit 109 generally cannot be illuminated exactly with the pupil facet mirror 121. The aperture rays often do not intersect at a single point when imaging the projection optical unit 109 which telecentrically images the center of the pupil facet mirror 121 onto the wafer 112. However, it is possible to find a surface area in which the spacing of the aperture rays, determined in pairwise fashion, is minimal. This surface area represents the entrance pupil or an area in real space that is conjugate thereto. In particular, this surface area has a finite curvature.

The projection optical unit 109 might have different positions of the entrance pupil for the tangential beam path and for the sagittal beam path. In this case, an imaging element, in particular an optical component part of the transfer optical unit, should be provided between the second facet mirror 121 and the reticle 106. With the aid of this optical component, it is possible to take account of the different poses of the tangential entrance pupil and the sagittal entrance pupil.

In the arrangement of the components of the illumination optical unit 103 illustrated in FIG. 1, the pupil facet mirror 121 is arranged in a surface area conjugate to the entrance pupil of the projection optical unit 109. The first field facet mirror 119 is arranged so as to be tilted in relation to the object plane 105. The first facet mirror 119 is arranged so as to be tilted in relation to an arrangement plane defined by the deflection mirror 118.

The first facet mirror 119 is arranged so as to be tilted in relation to an arrangement plane defined by the second facet mirror 121.

Figure 2:
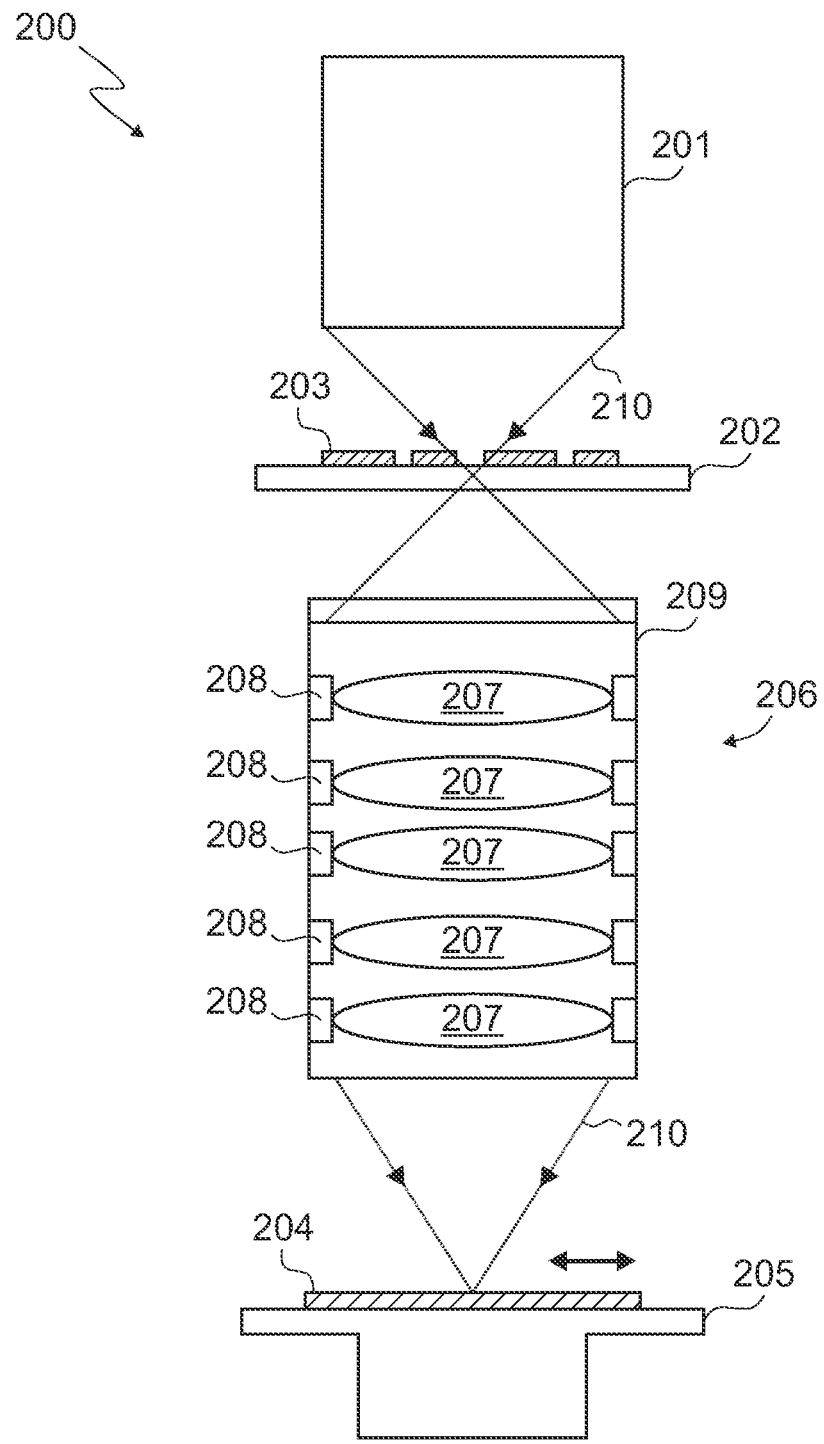
FIG. 2 shows a DUV projection exposure apparatus.

FIG. 2 illustrates an exemplary DUV projection exposure apparatus 200, in which the principle of the present invention may in principle also be used to clean the lenses to remove foreign particles. The EUV-specific components, for example a collector mirror 116, are then not required to this end or may be substituted accordingly. The DUV projection exposure apparatus 200 comprises an illumination system 201, a device known as a reticle stage 202 for receiving and exactly positioning a reticle 203, by which the later structures on a wafer 204 are determined, a wafer holder 205 for holding, moving and exactly positioning the wafer 204, and an imaging device, specifically a projection optical unit 206, with a plurality of optical elements, in particular lens elements 207, which are held by way of mounts 208 in a lens housing 209 of the projection optical unit 206.

As an alternative or in addition to the lens elements 207 illustrated, provision can be made of various refractive, diffractive and/or reflective optical elements, inter alia also mirrors, prisms, terminating plates and the like.

The basic functional principle of the DUV projection exposure apparatus 200 makes provision for the structures introduced into the reticle 203 to be imaged onto the wafer 204.

The illumination system 201 provides a projection beam 210 or projection radiation in the form of electromagnetic radiation, which is required for the imaging of the reticle 203 on the wafer 204. The source used for this radiation may be a laser, a plasma source or the like. The radiation is shaped in the illumination system 201 with optical elements such that the projection beam 210 has the desired properties with regard to diameter, polarization, shape of the wavefront and the like when it is incident on the reticle 203.

An image of the reticle 203 is generated with the projection beam 210 and transferred from the projection optical unit 206 onto the wafer 204 in an appropriately reduced form. In this case, the reticle 203 and the wafer 204 can be moved synchronously, so that regions of the reticle 203 are imaged onto corresponding regions of the wafer 204 virtually continuously during what is called a scanning operation.

An air gap between the last lens element 207 and the wafer 204 can optionally be replaced by a liquid medium which has a refractive index of greater than 1.0. The liquid medium can be high-purity water, for example. Such a set-up is also referred to as immersion lithography and has an increased photolithographic resolution.

The use of the invention is not restricted to use in projection exposure apparatuses 100, 200, in particular also not with the described structure. The invention is suitable for any lithography system, but in particular for projection exposure apparatuses having the described structure. The invention is also suitable for EUV projection exposure apparatuses which have a smaller image-side numerical aperture than those described in the context of FIG. 1. In particular, the invention is also suitable for EUV projection exposure apparatuses which have an image-side numerical aperture from 0.25 to 0.5, preferably 0.3 to 0.4, particularly preferably 0.33. The invention and the following exemplary embodiments should also not be understood as being restricted to a specific design. The figures that follow illustrate the invention merely by way of example and in highly schematized form.

Attention is drawn to the fact that the measurement apparatus according to the invention described below, the method according to the invention for measuring a shape of a surface by interferometry, the processing method according to the invention for processing a test object and also the optical element can be used, in particular, in lithography systems and, in this context, in projection exposure apparatuses for semiconductor lithography in particular, but the use in other fields where a precise measurement is important or in which a test object, more particularly an optical element, should be measured or processed highly accurately, can also be used.

The exemplary embodiments depicted below should be understood accordingly, especially the exemplary embodiments explained on the basis of FIGS. 3 to 17.

Figure 3:
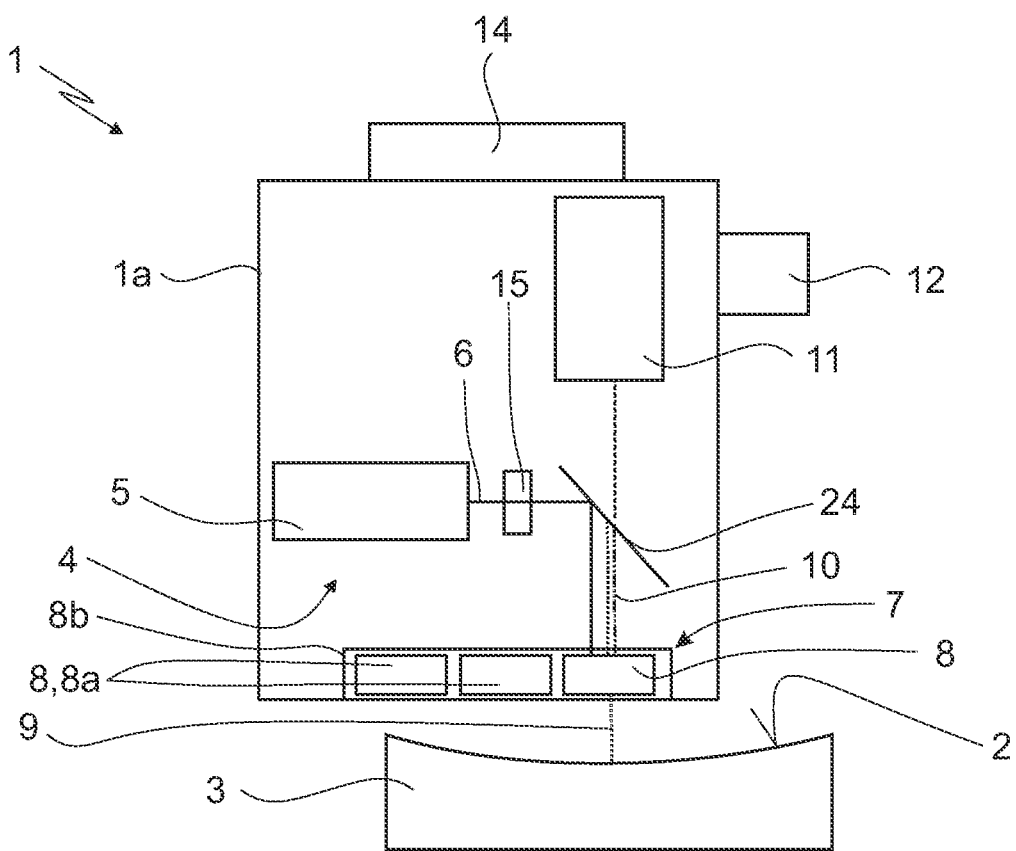
FIG. 3 shows a schematic illustration of a possible embodiment of the measurement apparatus according to the invention.

FIG. 3 shows a schematic illustration of a possible embodiment of the measurement apparatus 1 according to the invention.

The measurement apparatus 1 for measuring a shape of a surface 2 of a test object 3, in particular an optical surface 2 of an optical element 3 which may be one of the optical elements 116, 118, 119, 120, 121, 122, Mi, 207 in particular, by interferometry, comprises an illumination device 4 with an illumination source 5 for generating an illumination wave 6, depicted in FIG. 3 as a solid line, and an interferometer device 7 having a splitting element 8 for splitting the illumination wave 6 into a test wave 9 (depicted as a dotted line in FIG. 3) directed at the surface 2 and a reference wave 10 (depicted as a dash-dotted line in FIG. 3).

Further, the measurement apparatus 1 comprises a registration device 11 for registering an interference pattern and for evaluating the interference pattern in order to determine a deviation of the shape of the surface 2 to be measured from a target shape. Additionally, the measurement apparatus 1 comprises a control device 12 which is configured to split the surface 2 to be measured into a plurality of individual areas 13 to be measured (see FIG. 6), and a positioning device 14 which is configured to position the test wave 9 on the surface 2 to be measured in such a way that the respective individual area 13 is fully illuminated. In this case, the registration device 11 is configured to determine, on the basis of the data from the individual areas 13, a deviation of the shape of at least a part of the surface 2 to be measured from the target shape.

The illumination device 4 comprises at least one adjustable stop device 15 which is configured to define a subaperture 16 (see FIG. 6) of the interferometer device 7 and adapt it to the individual area 13 to be measured in each case.

Preferably, the splitting element 8 is further configured to form a non-spherical wavefront of the test wave 9.

In the exemplary embodiment depicted in FIG. 3, provision is made of a beam splitter 24 for guiding the illumination wave 6 onto the splitting element 8 and for allowing the returning radiation formed from the reference wave 10 and the test wave 9 to pass through in the direction of the registration device 11.

In the exemplary embodiment depicted in FIG. 3, the positioning device 14 is configured to position the illumination device 4, the registration device 11 and the interferometer device 7 relative to the test object 3 along six degrees of freedom such that the illumination device 4, the registration device 11 and the interferometer device 7 remain arranged relative to one another in the same way.

As an alternative or in addition, provision can be made in an embodiment (not depicted) for the positioning device 14 to be configured to merely position the splitting element 8 and/or the interferometer device 7 relative to the test object 3 along six degrees of freedom, wherein a beam steering device may be provided in order to suitably steer the illumination wave 6 to the splitting element 8, even in the case of changing locations and alignments of the splitting element 8.

In the exemplary embodiment depicted in FIG. 3, a set 8a of interchangeable splitting elements 8 is preferably provided for measuring the surface 2 of the test object 3, with the splitting elements 8 of the set 8a being embodied such that a splitting element 8 adapted to the target shape of the individual area 13 to be measured is selectable for each individual area 13 to be measured.

To interchange the interchangeable splitting elements 8 of the set 8a, an interchange device 8b is preferably provided in the exemplary embodiment depicted in FIG. 3, this interchange device preferably being communicatively and operatively connected to the control device 12 in order to select a splitting element 8 which forms a test wave 9 that is preferably adapted to the best possible extent to the target shape of the individual area 13 to be measured.

In a preferred embodiment not depicted in FIG. 3, the interchange device 8b does not carry a plurality of splitting elements 8 in the sensor. In the case of an automated interchange carried out by the interchange device 8b, provision can be made for the interchange device 8b to have a handling device which is configured to remove a first splitting element 8 and then collect a second splitting element 8 from a storage device, in particular a shelf, and attach this second splitting element to the interferometer device 7.

In the exemplary embodiment depicted in FIG. 3, the splitting element 8 is preferably adapted, particularly preferably adapted to the best possible extent, to the target shape of the individual area 13.

In the exemplary embodiment depicted in FIG. 3, the illumination device 4, the registration device 11 and the interferometer device 7 are preferably securely arranged on a joint frame 1a, which may also be in the form of a housing.

In the exemplary embodiment depicted in FIG. 3, all optical components of the measurement apparatus 1 are preferably in the form of reflective and/or refractive components.

Figure 4:
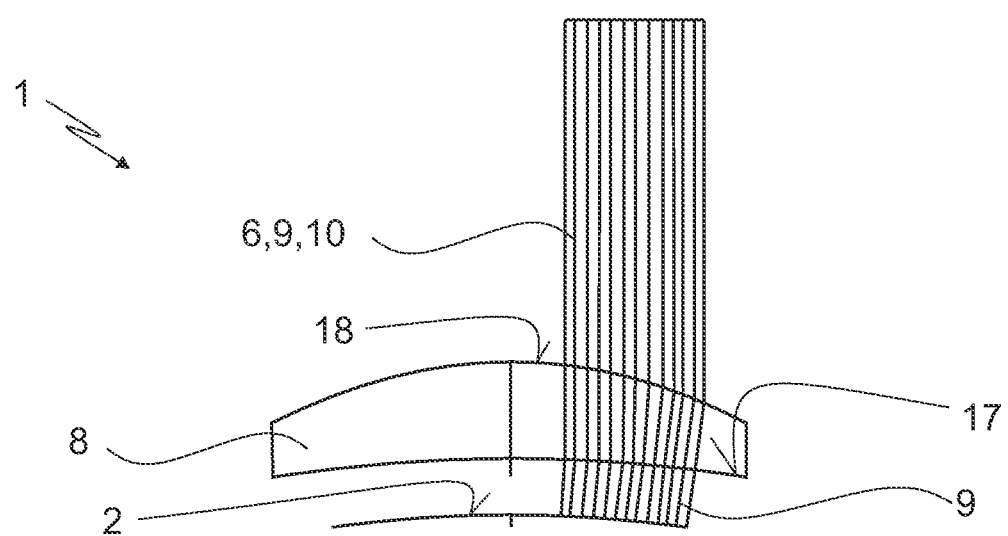
FIG. 4 shows a schematic illustration of a detail from a further possible embodiment of the measurement apparatus according to the invention.

FIG. 4 shows a detail of a further possible embodiment of the measurement apparatus 1.

In the exemplary embodiment depicted in FIG. 4, the splitting element 8 is preferably configured to form an astigmatic and/or toroidal wavefront of the test wave 9.

In the exemplary embodiments depicted in FIGS. 3 and 4, the interferometer device 7 is in the form of a Fizeau interferometer. FIG. 4 shows an embodiment in which the splitting element 8 is preferably in the form of a Fizeau element which comprises a reference surface 17 and a back side surface 18 opposite to the reference surface 17.

In the exemplary embodiment depicted in FIG. 4, the reference surface 17 preferably has an astigmatic and/or toroidal form.

Further, the exemplary embodiment depicted in FIG. 4 shows an embodiment in which the back side surface 18 is preferably shaped such that the, preferably plane, illumination wave 6 is incident at least approximately perpendicularly on the reference surface 17 at each point of a cross section of the illumination wave 6.

At each point of a cross section of the illumination wave 6 in the exemplary embodiment depicted in FIG. 4, the illumination wave 6 is preferably incident on the back side surface 18 at an angle of at least 0.1 degrees, preferably of at least 0.3 degrees, with respect to the surface normal.

In the exemplary embodiment depicted in FIG. 4, the splitting element 8 and/or the positioning device 14 are designed such that, at each point of a cross section of the test wave 9, the test wave 9 is incident at least approximately perpendicularly on the surface 2 to be measured.

Figure 5:
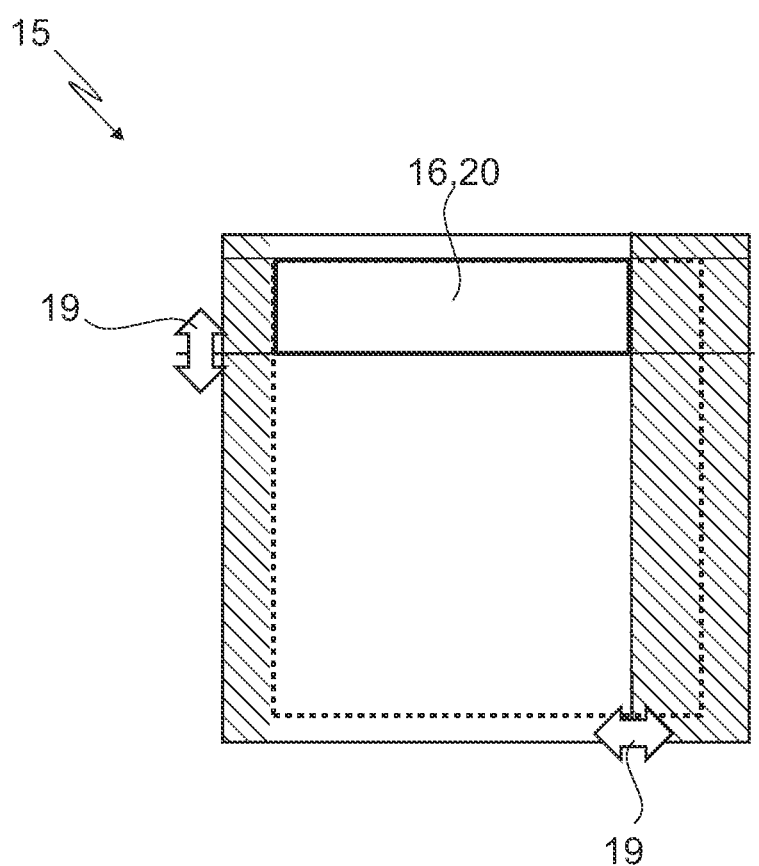
FIG. 5 shows a schematic illustration of a possible embodiment of a stop device of the measurement apparatus according to the invention.

FIG. 5 shows a schematic illustration of a possible embodiment of the stop device 15.

In the exemplary embodiment depicted in FIG. 5, the stop device 15 is preferably in the form of a rectangular stop with adjustable side lengths 19. In FIG. 5, the adjustable side lengths 19 are represented as double-headed arrows. A measurement field 20 enabled by the rectangular stop is depicted surrounded by a bold frame in FIG. 5.

Figure 6:
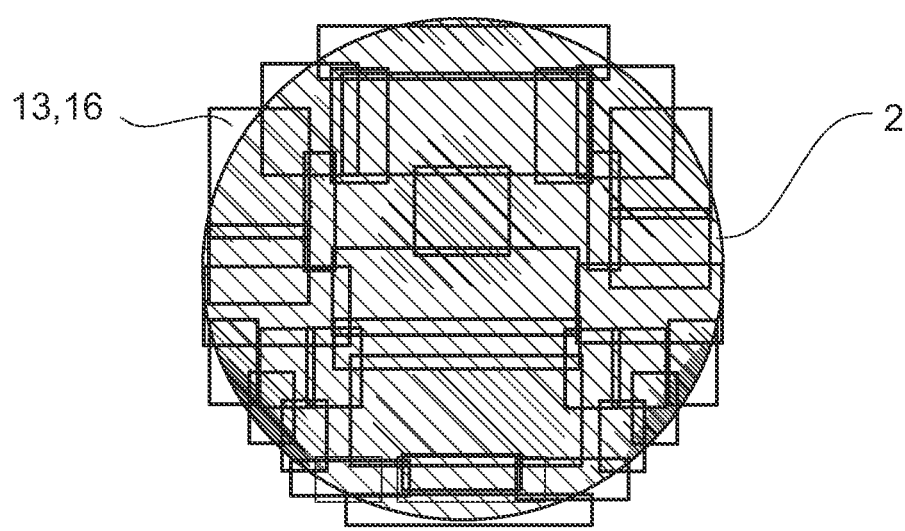
FIG. 6 shows a schematic illustration of a possible split of a surface to be measured into a plurality of individual areas to be measured.

In this case, the measurement field 20 defines the subaperture 16 which is adapted to the individual area 13 to be measured (see FIG. 6).

In an alternative or additional embodiment of the stop device 15, the stop device 15 may have a circular stop with an adjustable diameter. In a further alternative or additional embodiment, the stop device 15 may comprise a multi-blade stop.

An embodiment in which the stop device 15 comprises a circular stop and a rectangular stop may be advantageous for obtaining specific geometric shapes of the individual areas 13. In a series connection, combinations of several or all embodiments of the stop device 15 may be advantageous.

FIG. 6 shows a schematic illustration of a possible split of the surface 2 to be measured into a plurality of individual areas 13 to be measured. In FIG. 6, the surface 2 to be measured is depicted using hatching.

The registration device 11 (see FIG. 3) is preferably configured to reconstruct the shape of the surface 2 from the individual areas 13.

The individual areas 13 are defined by respective subapertures 16.

The control device 12 (see FIG. 1) is further preferably configured to determine a number, a position, a shape and/or an overlapped individual area 13 such that a measurement parameter is optimized. In the case of the present exemplary embodiment depicted in FIG. 6, the measurement parameter is a measurement accuracy of an overall surface shape of the surface to be measured.

In the exemplary embodiments depicted in FIGS. 3 to 6, the control device 12 is preferably respectively configured to determine the number, position and/or shape of the individual areas 13 such that a greatest occurring gradient in the respective individual area 13 does not exceed a limit gradient of 5 mrad, preferably 1 mrad, particularly preferably 0.5 mrad.

Accordingly, FIG. 6 shows subapertures 16 of variable size, which are arranged on the surface 2 to be tested, in particular a free-form surface. In the exemplary embodiment depicted in FIG. 6, the size of the individual subapertures 16 is restricted by the maximally admissible gradient in the individual area 13.

Figure 7:
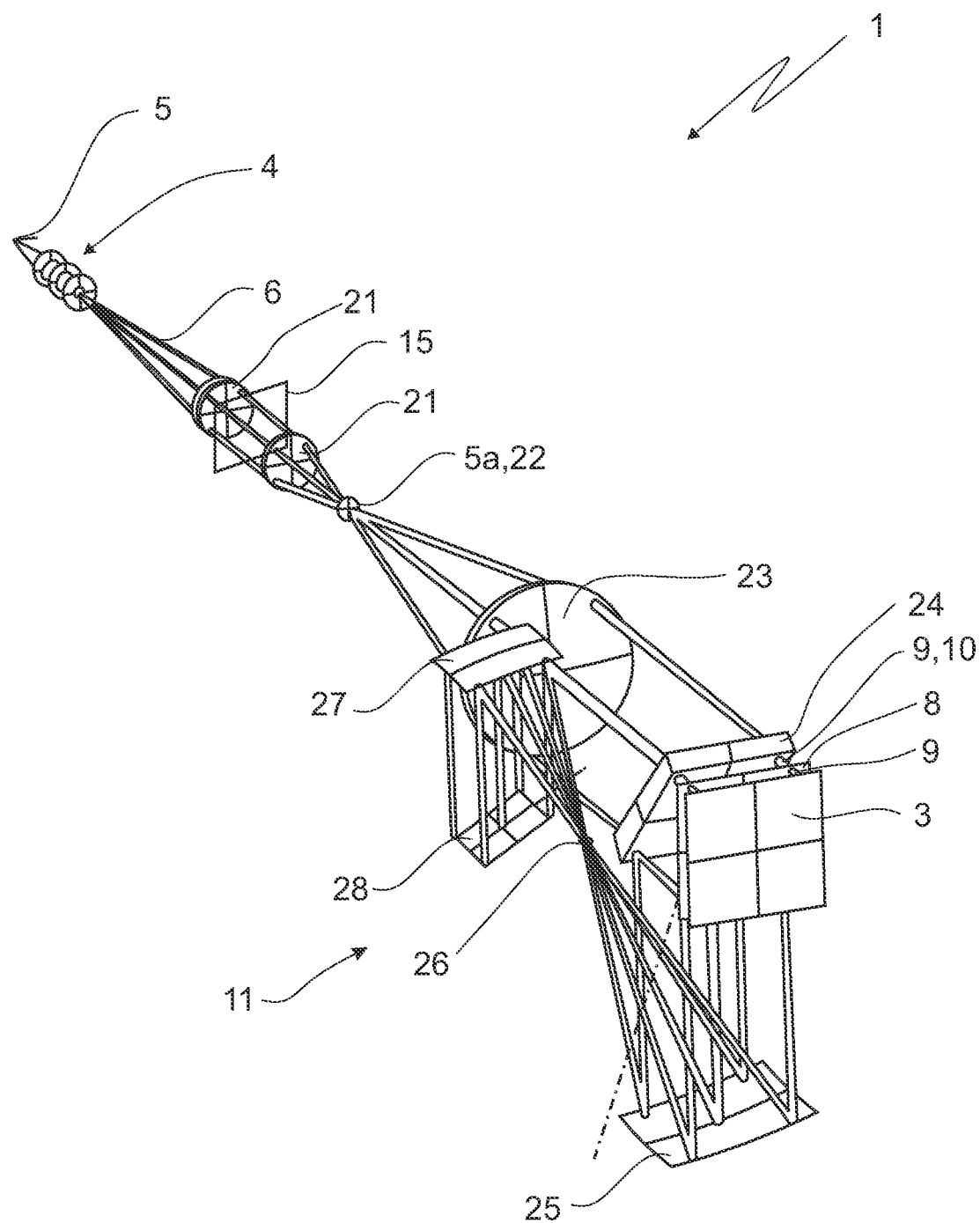
FIG. 7 shows a schematic illustration of an isometric view of a further possible embodiment of the measurement apparatus according to the invention.

FIG. 7 shows an isometric view of a schematic illustration of a further possible embodiment of the measurement apparatus 1.

In this case, the stop device 15 is arranged in a telescope formed by lens elements 21. An illumination mask element 22 is arranged in a Fourier plane. The stop device 15 is imaged onto the surface 2 to be measured (not depicted) with an illumination lens 23.

Following a passage through the illumination lens 23, the illumination source 6 is transmitted through a beam splitter 24 and subsequently strikes the splitting element 8 (depicted as a plate in simplified fashion in FIG. 7) which forms the test wave 9 that strikes the surface 2 of the test object 3. The returning test wave 9 and the reference wave 10 are reflected at the beam splitter 24 to a parabolic focusing mirror 25.

The parabolic focusing mirror 25 focuses radiation, formed by the test wave 9 with the reference wave 10 superposed thereon, onto a secondary stop device 26, with which a shape of the individual areas 13 can be defined further.

The radiation formed by the superposition of the test wave 9 and the reference wave 10 strikes a parabolic eyepiece mirror 27, which reflects the radiation on a sensor chip 28, after a passage through the secondary stop device 26. The parabolic focusing mirror 25, the secondary stop device 26, the parabolic eyepiece mirror 27 and the camera chip 28 are part of the registration device 11 in this case.

Figure 8:
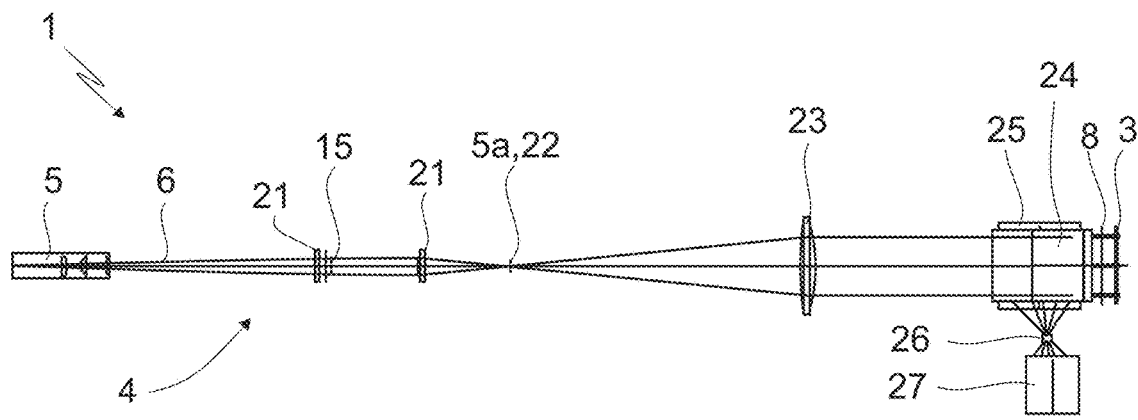
FIG. 8 shows a schematic illustration of a further possible embodiment of the measurement apparatus according to the invention in a side view.

FIG. 8 shows a schematic illustration of a further possible embodiment of the measurement apparatus 1 in a side view.

In respect of the reference signs, reference is made to the list of reference signs and the allocation in FIG. 7.

Provision can be made for the splitting element 8 to have an at least approximately rectangular embodiment, with the side lengths being 50 mm to 200 mm, preferably 120 mm to 140 mm.

Figure 9:
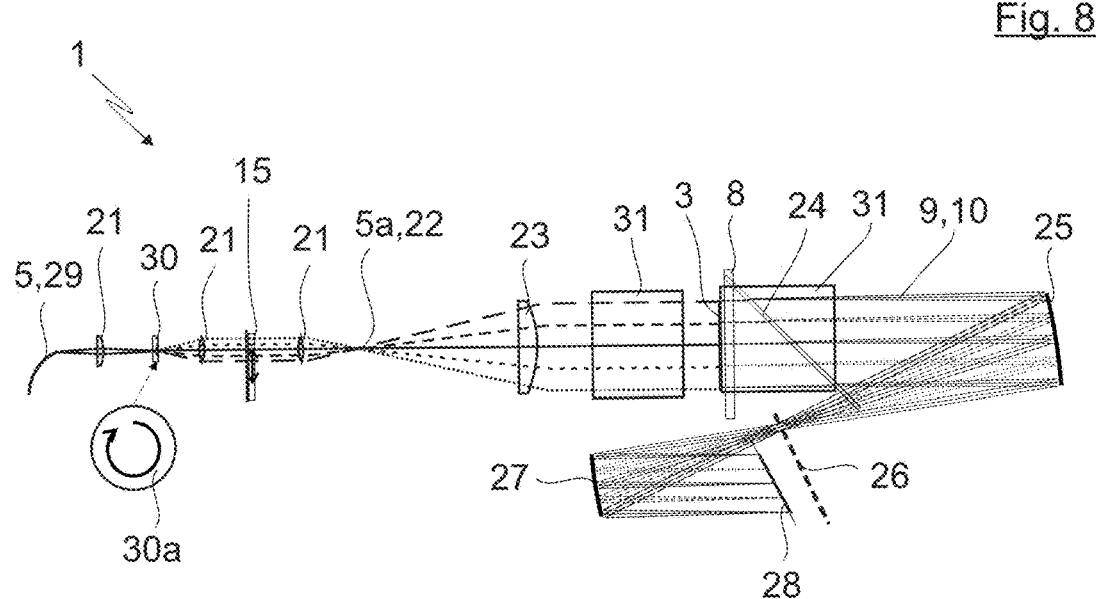
FIG. 9 shows a schematic illustration of a further side view of a further possible embodiment of the measurement apparatus according to the invention.

FIG. 9 shows a schematic illustration of a further side view of a further possible embodiment of the measurement apparatus 1.

In the exemplary embodiment depicted in FIG. 9, the illumination source 5 is formed by an optical waveguide 29. The illumination wave 6 is focused on a reduction device 30 using a lens element 21.

In this case, the reduction device 30 is provided and configured to reduce a spatial coherence of the illumination wave 6.

In the exemplary embodiment depicted in FIG. 9, the reduction device 30 is embodied as a rotating diffusion plate 30a.

As an alternative or in addition, provision can be made for the reduction device 30 to be in the form of a rotating microlens array, which may serve as a secondary light source.

In the exemplary embodiments depicted in FIGS. 8 and 9, the illumination lens 23 is in the form of a lens element in each case. As an alternative or in addition, provision can be made for the illumination lens 23 to be in the form of a lens element system.

In the exemplary embodiment depicted in FIG. 9, the secondary stop device 26 preferably is in the form of a mask plate, which can be positioned via a suitable displacement device in the beam path in such a way that the radiation passes through a suitable aperture in the mask plate.

The illumination wave 6 is deflected by a deflection mirror 31 prior to an incidence on the beam splitter 24 and the test object 3. The beam path depicted in FIG. 9 is simplified inasmuch as a structure of the measurement apparatus 1, three-dimensional in a certain sense, is depicted in a folded-open or stretched-out form.

Figure 10:
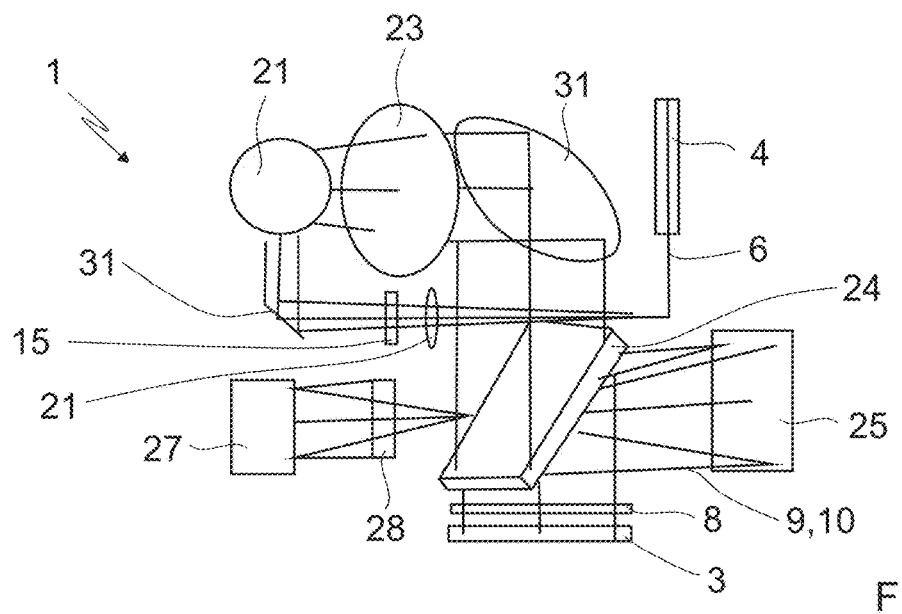
FIG. 10 shows a schematic illustration of the measurement apparatus according to FIG. 9 in a spatially folded state.

FIG. 10 shows a schematic illustration of the measurement apparatus 1 according to FIG. 9 in a spatially folded state. The deflection mirrors 31 and the parabolic mirrors 25 and 27 allow spatial folding of the measurement apparatus 1. With regard to the allocation of reference signs, reference is made to the declaration and explanations in relation to FIG. 9.

Figure 11:
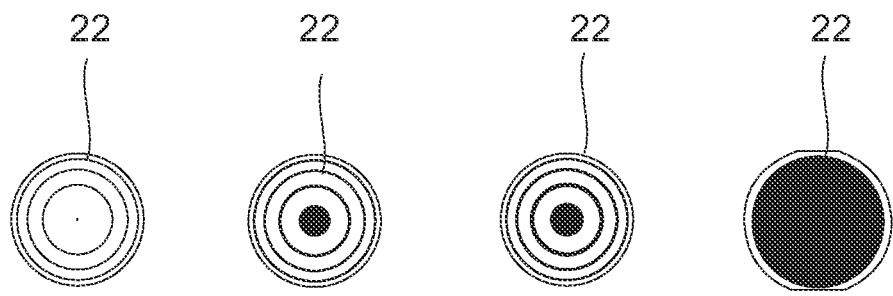
FIG. 11 shows a schematic illustration of possible embodiments of the illumination mask element.

FIG. 11 shows a schematic illustration of possible embodiments of the illumination mask element 22.

In the embodiments depicted in FIG. 11, regions of the illumination mask element 22 coloured black are each opaque. Accordingly, the illumination mask element 22 depicted to the left only has three thin opaque rings, while the illumination mask element 22 depicted to the right substantially corresponds to a virtually closed stop. The intermediate forms depicted in the center block the illumination wave 6 to different extents.

In particular, a contrast of the interference pattern can be increased and improved by way of the illumination mask elements 22 depicted in FIG. 11.

Figure 12:
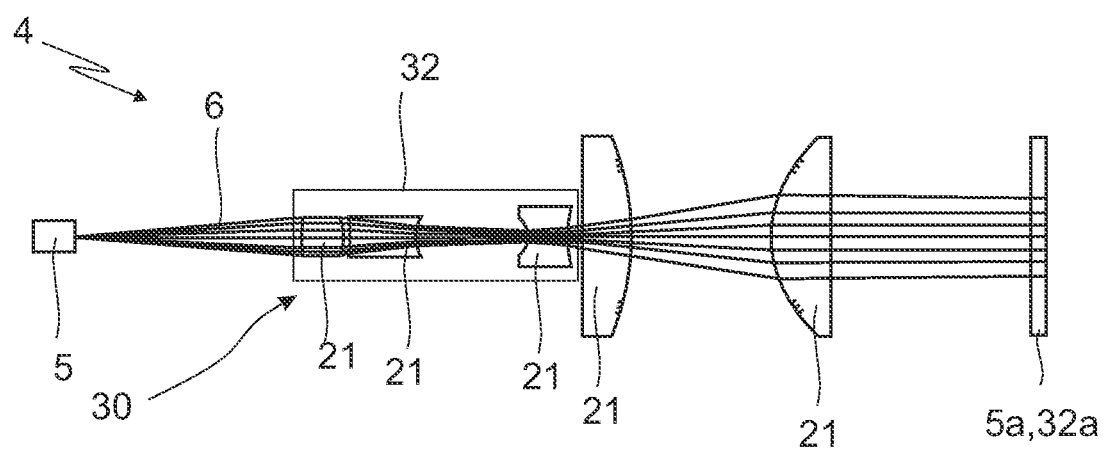
FIG. 12 shows a schematic illustration of a possible embodiment of an illumination device of the measurement apparatus according to the invention.

FIG. 12 shows a schematic illustration of a possible embodiment of the illumination device 4.

In the exemplary embodiment depicted in FIG. 12, the reduction device 30 comprises a pivoting-in optical unit 32 and a diffusor 32a.

The pivoting-in optical unit 32 in turn comprises a group of lens elements 21, which is arranged and configured so that the diffusor 32a is illuminated homogeneously after the passage of the illumination wave 6 through the telescope.

The pivoting-in optical unit 32 makes it possible to switch between a coherent and an incoherent illumination by way of the illumination wave 6, by virtue of the pivoting-in optical unit 32 being pivoted into or pivoted out of a beam path of the measurement apparatus 1. In the exemplary embodiment depicted in FIG. 12, the pivoting-in optical unit 32 comprises three lens elements 21, and so there is no need to use two separate optical systems.

Provision can be made for the pivoting-in optical unit 32 to be configured to transform imaging properties of the illumination device 4. In particular, provision can be made for the pivoting-in optical unit 32 to transform point-to-point imaging, in particular imaging implemented from the illumination source 5 to the illumination pupil 5a, to imaging implemented from a point to infinity.

Figure 13:
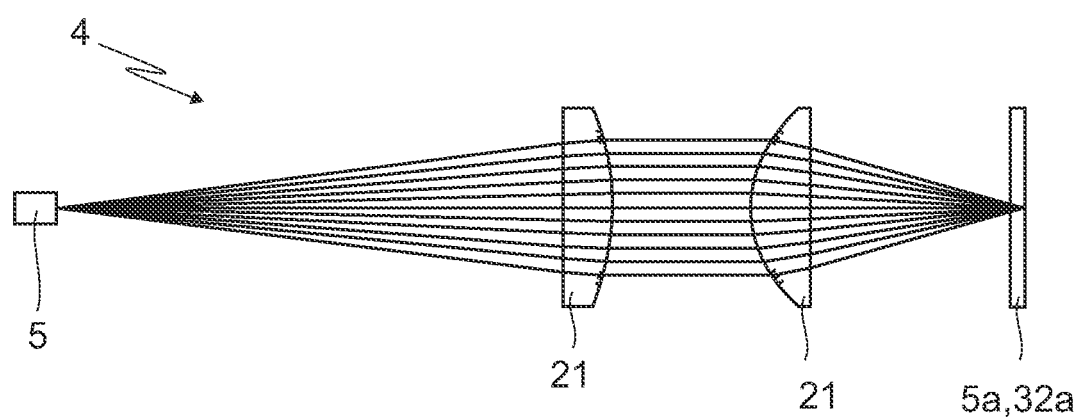
FIG. 13 shows a schematic illustration of the illumination device according to FIG. 12 with a pivoted-out pivoting-in optical unit.

FIG. 13 shows a schematic illustration of the illumination device 4 according to FIG. 12, with the pivoting-in optical unit 32 having been removed from the beam path. As a result, the diffusor 32a is illuminated in punctiform fashion. Accordingly, switching between spatially coherent and partly coherent illumination is implemented by way of the pivoting-in of the pivoting-in optical unit 32. A precise appearance of the secondary light source is determined by an arrangement of a suitable illumination mask element 22 (see FIG. 11) in the illumination pupil 5a.

Figure 14:
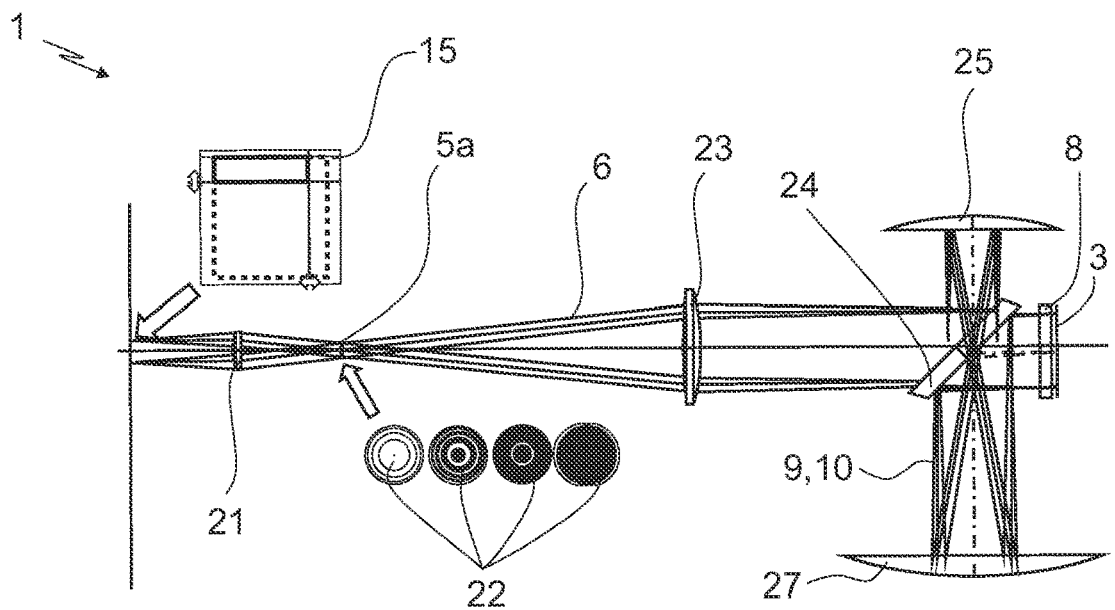
FIG. 14 shows a further schematic illustration of a part of the measurement apparatus according to the invention in a side view.

FIG. 14 shows a further schematic illustration of a part of the measurement apparatus 1 in a side view.

In particular, an imaging beam path is depicted in FIG. 14. FIG. 14 clarifies that the intensity distribution of the illumination wave 6 at the location of the stop device 15 is imaged onto the plane of the surface 2 of the test object 3 to be measured. Further, FIG. 14 also depicts the stop device 15 and the illumination mask elements 22. The fact that a plurality of illumination mask elements 22 are depicted should indicate that an interchange device for the illumination mask elements 22 is provided in order to be able to interchange these in a simple manner.

Reference is made to FIG. 9 in relation to the further reference signs.

Figure 15:
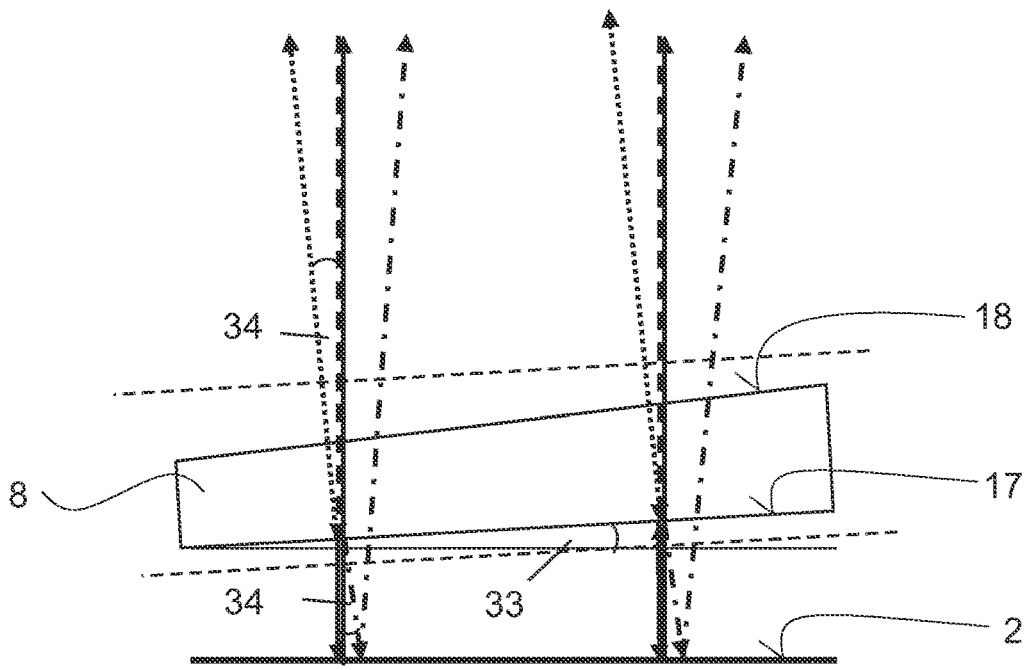
FIG. 15 shows a detailed schematic illustration of the beam paths in a region of a splitting element and a surface to be measured.

FIG. 15 shows a detailed schematic illustration of the beam paths in the region of the splitting element 8 and the surface 2 to be measured.

It is evident that the splitting element 8 is angled at a work angle 33 in relation to the surface 2 to be measured. This yields a reference angle 34 between the returning test wave 9 and the returning reference wave 10.

It is further evident from FIG. 15 that an interference reflection wave 35 is deflected away from the beam path of the reference wave 10 and the test wave 9.

The embodiments of the measurement apparatus 1 explained in conjunction with FIGS. 3 to 15 are particularly suitable for carrying out a method for measuring a shape of a surface 2 of a test object 3 by interferometry.

Figure 16:
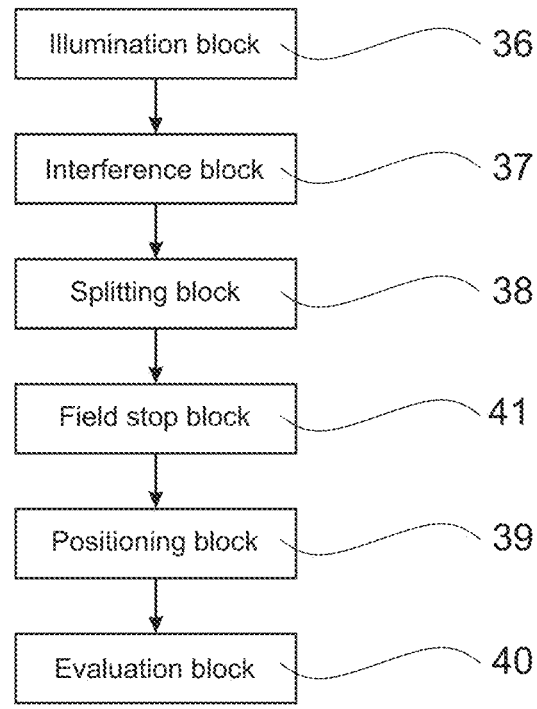
FIG. 16 shows a block diagram illustration of the method according to the invention.

FIG. 16 shows a block diagram illustration of a method for measuring the shape of the surface 2 of the test object 3, in particular an optical surface 2 of an optical element 3 which can in particular be one of the optical elements 116, 118, 119, 120, 121, 122, Mi, 207, by interferometry.

In an illumination block 36, the illumination wave 6 is split into the test wave 9 which is directed at the surface 2 and the reference wave 10 by the splitting element 8.

In an interference block 37, the returning test wave 9 which has interacted with the surface 2 to be measured is combined with the reference wave 10 and an interference pattern is generated.

In an evaluation block 40, the interference pattern is evaluated in order to determine a deviation of the shape of the surface 2 to be measured from a target shape.

In a splitting block 38, the surface 2 to be measured is split into a plurality of individual areas 13 to be measured in succession.

In a positioning block 39, the test wave 9 is positioned on the surface 2 to be measured such that the respective individual area 13 is illuminated in full in at least approximately perpendicular fashion.

To illuminate the individual areas 13, the subaperture 16 which defines the size of the test wave 9 is adapted to the individual area 13 to be measured in each case in a field stop block 41. Preferably, the field stop block 41 is temporally located after the splitting block 38 and before the positioning block 39.

The blocks 36 to 41 are preferably carried out in the specified chronological sequence. A different sequence or a parallel execution of a plurality of blocks may also be advantageous, in particular the chronological sequence of the blocks 36 to 41 depicted in FIG. 16.

In the exemplary embodiment depicted in FIG. 16, provision is preferably also made for a non-spherical wavefront of the test wave 9, which is adapted to the target shape of the individual area 3 to be measured, to be formed by the splitting element 8 as part of the illumination block 36.

Within the scope of the illumination block 36, provision can preferably further be made for a set 8a of interchangeable splitting elements 8 to be provided for measuring the surface 2 of the test object 3, the splitting elements 8 of the set 8a being embodied in a manner adapted to the individual area 13 of the surface 2 of the test object 3 to be measured in such a way that a splitting element 8 which is adapted to the target shape of the individual area 13 to be measured is available for each of the individual areas 13, and a splitting element 8 which is adapted to the target shape of the individual area 13 being selected from the set 8a for the purpose of measuring each individual area 13. The set 8a of interchangeable splitting elements 8 is preferably stored in a storage device, in particular a shelf.

As part of the evaluation block 40, provision is preferably made for the shape of the surface 2 to be reconstructed from the individual areas 13.

As part of the illumination block 36, provision is preferably further made for, at the reference surface 17 of the splitting element 8, a portion of the illumination wave 6 to be transmitted as the test wave 9 and a portion of the illumination wave 6 to be reflected as the reference wave 10.

Within the scope of the positioning block 39, provision is preferably made for the splitting element 8 to be positioned at a distance of 0.1 cm to 10 cm, preferably from 0.5 cm to 3 cm, particularly preferably from 1.5 cm to 2.5 cm, from the surface 2.

As part of the illumination block 36, provision can preferably be made for the splitting element 8 to be embodied as a Fizeau element.

Likewise within the scope of the illumination block 36, provision can be made for the reference surface 17 of the Fizeau element to be embodied to be adapted to the, preferably average and/or mean, target shape of the surface 2 of the test object 3 to be measured.

Furthermore, the formation of an astigmatic and/or toroidal wavefront of the test wave 9 can be provided as part of the illumination block 36.

The positioning block 39 and/or the illumination block 36 may provide for the test wave 9 to be guided as perpendicularly as possible to the surface 2 and/or as parallel as possible a mean surface normal at each location of the respective individual areas 13.

The positioning block 39 may preferably contain a method step in which, for measuring the individual areas 13, the interferometer device 7, which comprises the stop device 15 and which forms the illumination wave 6, the reference wave 10 and the test wave 9, is positioned relative to the surface 2 such that the test wave 9 strikes the surface 2 as perpendicularly as possible.

Within the scope of the illumination block 36, provision is preferably made for the subaperture 16 to be defined by the stop device 15 with a circular stop having an adjustable diameter and/or a rectangular stop having adjustable side lengths and/or with a multi-blade stop.

At least one of the blocks 36 to 41 may provide a method step in which the individual areas 13 of the surface 2 are measured through registration with a subaperture 16 assigned to the respective individual area 13.

The splitting block 38 may contain a method step in which a number, a position, a shape and/or an overlap of the separate individual areas 13 is determined such that a measurement parameter is optimized.

In particular, the splitting block 38 may preferably contain a method step in which the number, position and/or shape of the individual areas 13 is determined such that a greatest occurring gradient in the respective individual area 13 does not exceed a limit gradient of 5 mrad, preferably 1 mrad, particularly preferably 0.5 mrad.

Figure 17:
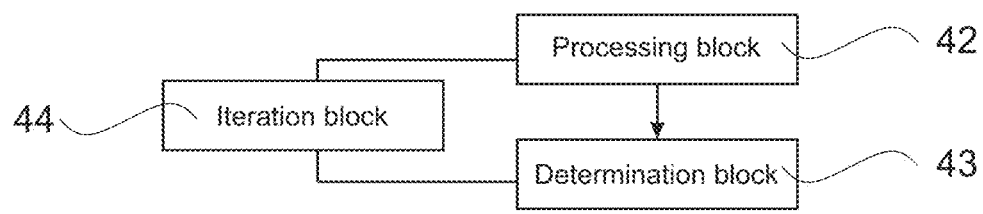
FIG. 17 shows a block diagram illustration of the processing method according to the invention.

FIG. 17 shows a block diagram illustration for processing the test object 3, in particular an optical element 116, 118, 119, 120, 121, 122, Mi, 207 for a lithography system 100, 200, in particular for a projection exposure apparatus 200, 300 for semiconductor lithography. In a processing block 42, the shape of the surface 2 of the test object 3, in particular an optical surface 2 of the optical element 116, 118, 119, 120, 121, 122, Mi, 207 is processed such that the shape of the surface 2 is at least approximated to a target shape.

In a determination block 43, the shape of the surface 2 is determined using one or more of the measurement apparatus 1 described in the context of FIGS. 3 to 15 and/or using the above-described method in one or more of the described preferred embodiments.

In an iteration block 44, provision is preferably made for the processing method to be carried out in one or more processing steps within the scope of the processing block 42 and, following each processing step, for the shape of the surface 2 to be determined within the scope of the determination block 43.

As part of the determination block 43, provision can be made for the processing method of the subsequent processing step to be determined on the basis of the determined shape of the surface 2.

In particular, provision can be made in the processing block 42 for the processing method to be a polishing method.

In the exemplary embodiments depicted in FIGS. 3 to 15, the surface 2 and the test object 3 consequently form an optical element 116, 118, 119, 120, 121, 122, Mi, 207, in particular for a lithography system. In this case, the surface 2 of the optical element 116, 118, 119, 120, 121, 122, Mi, 207 has been measured using a measurement apparatus 1 or a method according to the above-described embodiments. As an alternative or in addition, provision can be made for the surface 2 of the optical element 116, 118, 119, 120, 121, 122, Mi, 207 to be processed using one of the embodiments of the above-described processing method.

LIST OF REFERENCE SIGNS

1 Measurement apparatus
1a Frame
2 Surface
3 Test object
4 Illumination device
5 Illumination source
5a Illumination pupil
6 Illumination wave
7 Interferometer device
8 Splitting element
8a Set of splitting elements
8b Interchange device
9 Test wave
10 Reference wave 11 Registration device
12 Control device
13 Individual area
14 Positioning device
15 Stop device
16 Subaperture
17 Reference surface
18 Back side surface
19 Side length
20 Measurement field
21 Lens element
22 Illumination mask element
23 Illumination lens
24 Beam splitter
25 Parabolic focusing mirror
26 Secondary stop device
27 Parabolic eyepiece mirror
28 Camera chip
29 Optical waveguide
30 Reduction device
30a Rotating diffusion plate
31 Deflection mirror
32 Pivoting-in optical unit
32a Diffusor
33 Work angle
34 Reference angle
35 Interference reflection wave
36 Illumination block
37 Interference block
38 Splitting block
39 Positioning block
40 Evaluation block
41 Field stop block
42 Processing block
43 Determination block
44 Iteration block
100 EUV projection exposure apparatus
101 Illumination system
102 Radiation source
103 Illumination optical unit
104 Object field
105 Object plane
106 Reticle
107 Reticle holder
108 Reticle displacement drive
109 Projection optical unit
110 Image field
111 Image plane
112 Wafer
113 Wafer holder
114 Wafer displacement drive
115 EUV/used/illumination radiation
116 Collector
117 Intermediate focal plane
118 Deflection mirror
119 First facet mirror/field facet mirror
120 First facets/field facets
121 Second facet mirror/pupil facet mirror
122 Second facets/pupil facets
200 DUV projection exposure apparatus
201 Illumination system
202 Reticle stage
203 Reticle
204 Wafer
205 Wafer holder
206 Projection optical unit
207 Lens element
208 Mount
209 Lens housing
210 Projection beam
Mi Mirrors

What is claimed is:

1. Measurement apparatus for measuring a shape of a surface of a test object by interferometry, comprising:
an illumination device comprising an illumination source configured to generate an illumination wave,
an interferometer device comprising a splitting element configured to split the illumination wave into a test wave, which is directed at the surface and returned as a returning test wave, and into a reference wave, and to combine the returning test wave, which has interacted with the surface being measured, with the reference wave,
a registration device configured to register an interference pattern and evaluate the interference pattern to determine a deviation of the shape of the surface being measured from a target shape,
a control device configured to split the surface being measured into a plurality of individual areas being measured, and
a positioning device configured to position the test wave on the surface being measured such that the individual areas are respectively fully illuminated, wherein:
the registration device is configured to determine, based on data from the individual areas, a deviation of the shape of at least a part of the surface being measured from the target shape, and
the illumination device further comprises at least one adjustable stop device configured to define a subaperture of the interferometer device and to adapt the subaperture to the respective individual areas being measured.

2. Measurement apparatus according to claim 1, wherein the splitting element is configured to form a non-spherical wavefront of the test wave.

3. Measurement apparatus according to claim 1, wherein the splitting element is configured to form an astigmatic and/or a toroidal wavefront as the test wave.

4. Measurement apparatus according to claim 1, wherein the splitting element is configured as a set of interchangeable splitting elements configured to measure the surface of the test object, with the splitting elements of the set being embodied such that each of the splitting elements is adapted to the target shape of the respective individual areas being measured and such that each of the splitting elements is configured to be selected for the respective individual areas being measured.

5. Measurement apparatus according to claim 1, wherein the interferometer device comprises a Fizeau interferometer, and the splitting element comprises a Fizeau element which comprises a reference surface and a back side surface opposite to the reference surface.

6. Measurement apparatus according to claim 5, wherein the reference surface of the Fizeau element has an astigmatic and/or a toroidal form.

7. Measurement apparatus according to claim 5, wherein the back side surface of the Fizeau element is shaped such that the illumination wave is incident at least approximately perpendicularly on the reference surface at each point of a cross section of the illumination wave.

8. Measurement apparatus according to claim 5,
wherein at each point of a cross section of the illumination wave, the illumination wave is incident on the back side surface of the Fizeau element at an angle of at least 0.1° with respect to the surface normal of the back side surface.

9. Measurement apparatus according to claim 1,
wherein the stop device comprises a circular stop with an adjustable diameter and/or a rectangular stop with adjustable side lengths and/or a multi-blade stop.

10. Measurement apparatus according to claim 1,
wherein the registration device is configured to reconstruct the shape of the surface from the respective individual areas.

11. Measurement apparatus according to claim 1,
wherein the control device is configured to determine a number, a position, a shape and/or an overlap of the individual areas such that a measurement parameter is optimized.

12. Measurement apparatus according to claim 1,
wherein the control device is configured to determine a number, a position and/or a shape of the individual areas such that a greatest occurring gradient in the respective individual area does not exceed a limit gradient of 1 mrad.

13. Measurement apparatus according to claim 1,
further comprising a reduction device configured to reduce a spatial coherence of the illumination wave.

14. Measurement apparatus according to claim 1,
wherein all optical components of the measurement apparatus are reflective and/or refractive components.

15. Measurement apparatus according to claim 1,
wherein the positioning device is configured to operate in six degrees of freedom.

16. Measurement apparatus according to claim 1,
wherein the splitting element and/or the positioning device is configured such that, at each point of a cross section of the test wave, the test wave is incident at least approximately perpendicularly on the surface being measured.

17. Method for measuring a shape of a surface of a test object by interferometry, comprising:
splitting an illumination wave into a test wave, which is directed at the surface and returned as a returning test wave, and a reference wave with a splitting element,
combining the returning test wave, which has interacted with the surface being measured, with the reference wave and generating an interference pattern,
evaluating the interference pattern to determine a deviation of the shape of the surface being measured from a target shape,
splitting the surface being measured into a plurality of individual areas being measured in succession,
positioning the test wave on the surface being measured such that the individual areas are respectively fully and at least approximately perpendicularly illuminated, and
illuminating the individual areas respectively with a subaperture which defines a size of the test wave, wherein the subaperture is adapted respectively to the individual areas being measured.

18. Method according to claim 17,
wherein a non-spherical wavefront of the test wave which is adapted to the target shape of the individual areas being measured is respectively formed by the splitting element.

19. Method according to claim 17,
wherein the shape of the surface is reconstructed from the individual areas.

20. Method according to claim 17,
wherein said splitting comprises providing a set of interchangeable splitting elements for measuring the surface of the test object, the splitting elements of the set each being embodied in a manner adapted to the respective individual areas of the surface of the test object being measured such that a respective splitting element which is adapted to the target shape of the individual area being measured is available for each of the individual areas, and a splitting element which is adapted to the target shape of the individual area is selected from the set for measuring each of the individual areas.

21. Method according to claim 17,
transmitting, at a reference surface of the splitting element, a portion of the illumination wave as the test wave and reflecting a portion of the illumination wave as the reference wave.

22. Method according to claim 17,
wherein the splitting element is positioned at a distance of 0.1 cm to 10 cm from the surface.

23. Method according to claim 17,
further comprising, at each location of the respective individual areas, guiding the test wave substantially parallel to a local mean surface normal and/or substantially perpendicular to the surface.

* * * * *